(12) United States Patent
Leventis et al.

(10) Patent No.: US 8,227,363 B2
(45) Date of Patent: Jul. 24, 2012

(54) HIGHLY POROUS AND MECHANICALLY STRONG CERAMIC OXIDE AEROGELS

(75) Inventors: Nicholas Leventis, Westlake, OH (US); Mary Ann B. Meador, Strongsville, OH (US); James C. Johnston, Euclid, OH (US); Eve F. Fabrizio, Ann Arbor, MI (US); Ulvi F. Ilhan, Istanbul (TR)

(73) Assignees: Ohio Aerospace Institute, Cleveland, OH (US); The United States of America as represented by the Administrator of National Aeronautics and Space Administration, Washington, DC (US)

( * ) Notice: Subject to any disclaimer, the term of this patent is extended or adjusted under 35 U.S.C. 154(b) by 272 days.

(21) Appl. No.: 12/658,318

(22) Filed: Feb. 8, 2010

(65) Prior Publication Data
US 2010/0179288 A1 Jul. 15, 2010

Related U.S. Application Data

(62) Division of application No. 11/266,025, filed on Nov. 3, 2005, now Pat. No. 7,732,496.

(60) Provisional application No. 60/624,666, filed on Nov. 3, 2004.

(51) Int. Cl.
*C08G 71/02* (2006.01)
*C08J 9/00* (2006.01)
(52) U.S. Cl. ........ 501/80; 501/152; 423/579; 423/592.1
(58) Field of Classification Search .................. 423/579, 423/592.1; 501/80, 152
See application file for complete search history.

(56) References Cited

U.S. PATENT DOCUMENTS

| | | | |
|---|---|---|---|
| 5,266,207 A | 11/1993 | Boye et al. | |
| 5,282,955 A | 2/1994 | Leventis et al. | |
| 5,321,102 A | 6/1994 | Loy et al. | |
| 5,457,564 A | 10/1995 | Leventis et al. | |
| 5,502,082 A | 3/1996 | Unger et al. | |
| 5,541,234 A | 7/1996 | Unger et al. | |
| 5,605,983 A | 2/1997 | Dauth et al. | |
| 5,691,054 A | 11/1997 | Tennent et al. | |
| 5,710,187 A | 1/1998 | Steckle, Jr. et al. | |
| 5,818,636 A | 10/1998 | Leventis et al. | |
| 5,846,658 A | 12/1998 | Tennent et al. | |
| 5,872,070 A | 2/1999 | Dismukes et al. | |
| 5,990,184 A | 11/1999 | Biesmans et al. | |
| 6,156,812 A | 12/2000 | Lau et al. | |
| 6,284,908 B1 | 9/2001 | Loy et al. | |

(Continued)

OTHER PUBLICATIONS

Armand, A.C. et al., "Caracterisation Acoustique et Mecanique des Aerogels de Silice [Acoustic and Mechanical Characterization of Silica Aerogels]," Journal de Physique IV, Colloque C1, supplement au Journal de Physique III, vol. 2, pp. C1-759-C1-762, Apr. 1992.

(Continued)

*Primary Examiner* — Irina S Zemel
(74) *Attorney, Agent, or Firm* — Pearne & Gordon LLP

(57) ABSTRACT

Structurally stable and mechanically strong ceramic oxide aerogels are provided. The aerogels are cross-linked via organic polymer chains that are attached to and extend from surface-bound functional groups provided or present over the internal surfaces of a mesoporous ceramic oxide particle network via appropriate chemical reactions. The functional groups can be hydroxyl groups, which are native to ceramic oxides, or they can be non-hydroxyl functional groups that can be decorated over the internal surfaces of the ceramic oxide network. Methods of preparing such mechanically strong ceramic oxide aerogels also are provided.

9 Claims, 11 Drawing Sheets
(1 of 11 Drawing Sheet(s) Filed in Color)

U.S. PATENT DOCUMENTS

| | | | |
|---|---|---|---|
| 6,300,385 B1 | 10/2001 | Hashida et al. | |
| 6,364,953 B1 | 4/2002 | Kawakami et al. | |
| 6,423,811 B1 | 7/2002 | Lau et al. | |
| 6,428,898 B1 | 8/2002 | Barsotti et al. | |
| 2002/0167118 A1 | 11/2002 | Billiet et al. | |
| 2003/0106487 A1 | 6/2003 | Huang | |
| 2004/0132846 A1 | 7/2004 | Leventis et al. | |
| 2004/0144726 A1 | 7/2004 | Chmelka et al. | |
| 2005/0192366 A1 | 9/2005 | Ou et al. | |
| 2005/0192367 A1 | 9/2005 | Ou et al. | |
| 2006/0216219 A1 | 9/2006 | DeFriend et al. | |
| 2007/0203341 A1 | 8/2007 | Shea et al. | |

OTHER PUBLICATIONS

Barton, T.J. et al., "Tailored Porous Materials," Chem. Mater., vol. 11, pp. 2633-2656, 1999.

Bruesch, P. et al, "Electrical and Infrared Dielectrical Properties of Silica Aerogels and of Silica-Aerogel-Based Composites," Applied Physics A—Solids and Surfaces, vol. 57, pp. 329-337, 1993.

Buttner, D. et al., "Thermal Loss Coefficients of Low-Density Silica Aerogel Tiles," Solar Energy, vol. 40, No. 1, pp. 13-15, 1988.

Capadona, L.A. et al., "Flexible, Low-Density Polymer Crosslinked Silica Aerogels," Polymer, vol. 47, pp. 5754-5761, 2006.

Caps, R. et al., "Thermal Transport in Monolithic Silica Aerogel," Revue de Physique Appliquee, Colloque C4, Supplement au No. 4, Tome 24, pp. C4-113-C4-118, Apr. 1989.

Courtens, E. et al., "Structure and Dynamics of Silica Aerogels," Philosophical Magazine B, vol. 65, No. 2, pp. 347-355, 1992.

Cross, J. et al., "Mechanical Properties of SiO2-Aerogels," Revue de Physique Appliquee, Colloque C4, Supplement au No. 4, Tome 24, pp. C4-185-C4-190, Apr. 1989.

Da Silva, A. et al., "Properties of Water Absorbed in Porous Silica Aerogels," Journal of Non-Crystalline Solids, vol. 145, pp. 168-174, 1992.

Damrau, U. et al., "Si MAS-NMR Investigations of Silica Aerogels," Journal of Non-Crystalline Solids, vol. 145, pp. 164-167, 1992.

Devreux, F. et al., "NMR Determination of the Fractal Dimension in Silica Aerogels," Physical Review Letters, vol. 65, No. 5, pp. 614-617, Jul. 30, 1990.

Ehrburger-Dolle, F. et al., "Relations Between the Texture of Silica Aerogels and Their Preparation," Journal of Non-Crystalline Solids, vol. 186, pp. 240-248, 1995.

Emmerling, A. et al., "Structural Modifications of Highly Porous Silica Aerogels upon Densification," J. Appl. Cryst., vol. 24, pp. 781-787, 1991.

Emmerling, A. et al., "Relationship Between Optical Transparency and Nanostructural Features of Silica Aerogels," Journal of Non-Crystalline Solids, vol. 185, pp. 240-248, 1995.

Gross, J. et al., "Mechanical Properties of SiO2 Aerogels," J. Phys. D: Appl. Phys., vol. 21, pp. 1447-1451, 1988.

Gross, J. et al., "Ultrasonic Velocity Measurements in Silica, Carbon and Organic Aerogels," Journal of Non-Crystalline Solids, vol. 145, pp. 217-222, 1992.

Gross, J. et al., "Ultrasonic Evaluation of Elastic Properties of Silica Aerogels," Materials Science and Engineering, vol. A168, pp. 235-238, 1993.

Hdach, H. et al., "Effect of Aging and PH on the Modulus of Aerogels," Journal of Non-Crystalline Solids, vol. 121, pp. 202-205, 1990.

Hench, L.L. et al., "The Sol-Gel Process," Chemical Reviews, vol. 90, No. 1, pp. 33-72, 1990.

Hrubesh, L.W. et al., "Thermal Properties of Organic and Inorganic Aerogels," J. Mater. Res., vol. 9, No. 3, pp. 731-738, 1994.

Hrubesh, L.W. et al., "Thin Aerogel Films for Optical, Thermal, Acoustic and Electronic Applications," UCRL-JC-117553 Preprint, International Symposium on Aerogels 4, Sep. 19-21, 1994, 17pgs, Berkley, CA.

Hund, J. F. et al., "Formation and Entrapment of Noble Metal Clusters in Silica Aerogel Monoliths by γ-Radiolysis," J. Phys. Chem. B, vol. 107, pp. 465-469, American Chemical Society, 2003.

Husing, N. et al., "Aerogels-Airy Materials: Chemistry, Structure and Properties," Angewandt Chemie International Edition, 37, (1998), pp. 22-45.

Ilhan, U.F. et al., "Hydrophobic Monolithic Aerogels by Nanocasting Polystyrene on Amine-Modified Silica," J. Mater. Chem., vol. 16, pp. 3046-3054, 2006.

Jang, K.Y. et al., "Study of Sol-Gel Processing for Fabrication of Hollow Silica-Aerogel Spheres," J. Vac. Sci. Technol. A., vol. 8, No. 3, pp. 1732-1735, May/Jun. 1990.

Katti, A. et al., "Chemical, Physical and Mechanical Characterization of Isocyanate Cross-linked Amine-Modified Silica Aerogels," Chem. Mater., vol. 18, pp. 285-296, American Chemical Society, 2006.

Kim, N.K. et al., "Fabrication of Hollow Silica Aerogel Spheres by a Droplet Generation Method and Sol-Gel Processing," J. Vac. Sci. Technol. A. 7(3), (1989), pp. 1181-1184.

Kramer, S.J. et al., "Organically Modified Silicate Aerogels, 'Aeromisils,'" Mat. Res. Soc. Symp. Proc., vol. 435, pp. 295-300, Materials Research Society, 1996.

Leventis, N. et al., "Durable Modification of Silica Aerogel Monoliths with Fluorescent 2,7-Diazapyrenium Moieties. Sensing Oxygen near the Speed of Open-Air Diffusion," Chem. Mater., vol. 11, pp. 2837-2845, American Chemical Society, 1999.

Leventis, N. et al., "Using Nanoscopic Hosts, Magnetic Guests, and Field Alignment to Create Anisotropic Composite Gels and Aerogels," Nano Letters, vol. 2, No. 1, pp. 63-67, American Chemical Society, 2002.

Leventis, N. et al., "Nanoengineering Strong Silica Aerogels," Nano Letters, vol. 2, No. 9, pp. 957-960, American Chemical Society, 2002.

Leventis, N. et al., "Nanoengineered Silica-Polymer Composite Aerogels with No Need for Supercritical Fluid Drying," Journal of Sol-Gel Science and Technology, vol. 35, pp. 99-105, Springer Science + Business Media, Inc. 2005.

Loy, D.A. et al., "Bridged Polysilsesquioxanes. Highly Porous Hybrid Organic-Inorgarnic Materials," Chem. Rev., vol. 95, pp. 1431-1442, 1995.

Loy, D.A. et al., "Sol-Gel Synthesis of Hybrid Organic-Inorgranic Materials. Hexylene- and Phenylene-Bridged Polysiloxanes," Chem. Mater., vol. 8, pp. 656-663, 1996.

Meador, M.A.B. et al., "Cross-Linking Amine-Modified Silica Aerogels with Epoxies: Mechanically Strong Lightweight Porous Materials," Chem. Mater., vol. 17, pp. 1085-1098, 2005.

Meador, M.A.B. et al., "Structure-Property Relationship in Porous 3D Nanostructures as a Function of Preparation Conditions: Isocyanate Cross-Linked Silica Aerogels," Chem. Mater., vol. 19, pp. 2247-2260, 2007.

Morris, C.A. et al., "Silica Sol as a Nanoglue: Flexible Synthesis of Composite Aerogels," Science, vol. 284, pp. 622-624, Apr. 23, 1999.

Novak, B.M. et al., "Low-Density, Mutually Interpenetrating Organic-Inorganic Composite Materials via Supercritical Drying Techniques," Chem. Mater., vol. 6, pp. 282-286, 1994.

Pajonik, G.M., "Some Catalytic Applications of Aerogels for Environmental Purposes," Catalysis Today, 52, (1999), pp. 3-13.

Phalippou, J. et al., "Fracture Toughness of Silica Aerogels," Revue de Physique Appliquee, Colloque C4, Supplement au No. 4, Tome 24, pp. C4-191-C4-196, Apr. 1989.

Phalippou, J. et al., "Glasses from Aerogels-Part 1. The Synthesis of Monolithic Silica Aerogels," Journal of Materials Sciences, vol. 25, No. 7, pp. 3111-3117, 1990.

Posselt, D. et al., "The Thermal Conductivity of Silica Aerogels in the Phonon, the Fracton and the Particle-Mode Regime," Europhysics Letters, vol. 16, No. 1, pp. 59-65, Sep. 1, 1991.

Rogacki, G. et al., "Diffusion of Ethanol-Liquid CO2 in Silica Aerogel," Journal of Non-Crystalline Solids, vol. 186, pp. 73-77, 1995.

Schaefer, D.W. et al., "Structure and Topology of Silica Aerogels," Journal of Non-Crystalline Solids, vol. 145, pp. 105-112, 1992.

Shea, K.J. et al., "Aryl-Bridged Polysilsesquioxanes-New Microporous Materials," Chemistry of Materials, vol. 1, pp. 572-574, 1989.

Shea, K.J. et al., "A Mechanistic Investigation of Gelation. The Sol-Gel Polymerization of Precursors to Bridged Polysilsesquioxanes," Acc. Chem. Res., vol. 34, pp. 707-716, 2001.

Shea, K.J. et al., "Bridged Polysilsesquioxanes. Molecular-Engineered Hybrid Organic-Inorganic Materials," Chem. Mater., vol. 13, pp. 3306-3319, American Chemical Society, 2001.

Sleator, T. et al., "Low-Temperature Specific Heat and Thermal Conductivity of Silica Aerogels," Physical Review Letters, vol. 66, No. 8, pp. 1070-1073, Feb. 25, 1991.

Tsou, P., "Silica Aerogel Captures Cosmic Dust Intact," Journal of Non-Crystalline Solids, vol. 186, pp. 415-427, 1996.

Tullo, A.H., "Stiff Competition-Long Fiber Reinforced Thermoplastics Are Gathering Strength in Key Industries," Chem. & Eng. News, pp. 21-22, Jan. 28, 2002.

Woigner, T. et al., "Mechanical Strength of Silica Aerogels," Journal of Non-Crystalline Solids, vol. 100, pp. 404-408, 1988.

Woigner, T. et al., "Scaling Law Variation of the Mechanical Properties of Silica Aerogels," Revue de Physique Appliquee, Colloque C4, Supplement au No. 4, Tome 24, pp. C4-179-C4-194, Apr. 1989.

Woigner, T. et al., "Glasses from Aerogels. Part 2-The Aerogel-Glass Transformation," Journal of Materials Sciences, pp. 3118-3126, 1990.

Woigner, T. et al., "Different Kinds of Fractal Structures in Silica Aerogels," Journal of Non-Crystalline Solids, vol. 121, pp. 198-201, 1990.

Woigner, T. et al., "Section 13. Rheological, Mechanical and Other Properties—Evolution of Mechanical Properties during the Alcogel-Aerogel-Glass Process," Journal of Non-Crystalline Solids, vol. 147 & 148, pp. 672-680, 1992.

Yim, T.J. et al., "Fabrication and Thermophysical Characterization of Nano-Porous Silica-Polyurethane Hybrid Aerogel by Sol-Gel Processing and Supercritical Solvent Drying Technique," Koren J. Chem. Eng., 19(1), (2002), pp. 159-166.

Zhang, G. et al., "Isocyanate-Crosslinked Silica Aerogel Monoliths: Preparation and Characterization," Journal of Non-Crystalline Solids, vol. 350, pp. 152-164, 2004.

Prosecution history for U.S. Appl. No. 10/643,578, retrieved from Public on Aug. 5, 2008.

International Search Report and Written Opinion dated Jun. 1, 2009 from PCT Application No. PCT/US08/80611 (Publication No. WO 2009/073287).

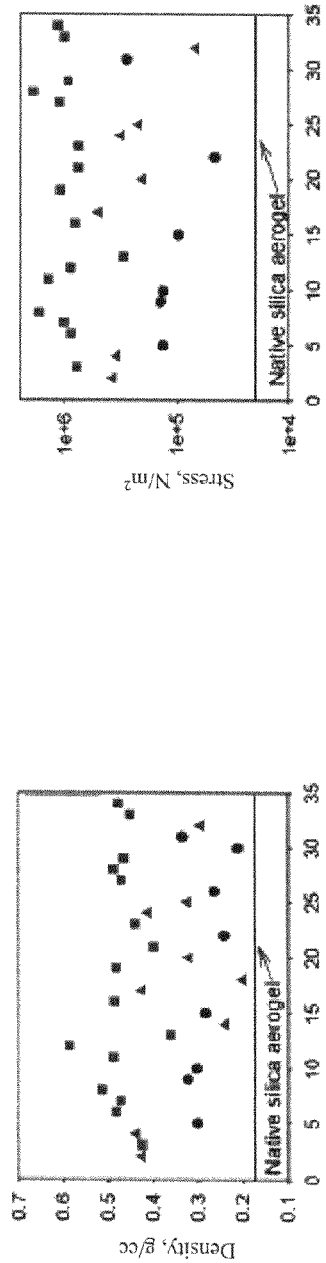
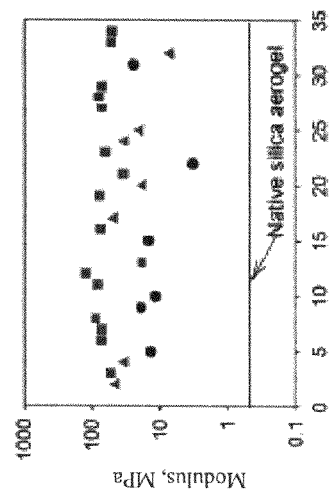
Fig. 5
Fig. 6
Fig. 7

HIGHLY POROUS AND MECHANICALLY STRONG CERAMIC OXIDE AEROGELS

This application is a divisional of U.S. utility patent application Ser. No. 11/266,025 filed Nov. 3, 2005, now U.S. Pat. No. 7,732,496, which application claims the benefit of U.S. provisional patent application Ser. No. 60/624,666 filed Nov. 3, 2004. The contents of both of these applications are incorporated herein by reference.

STATEMENT OF GOVERNMENT-SPONSORED RESEARCH

This invention was made with U.S. government support under contract Nos. NCC3-1089 and NCC3-887, both NASA Grant/Cooperative Agreements awarded by the National Aeronautics and Space Administration. The U.S. government has certain rights in this invention.

BACKGROUND OF THE INVENTION

1. Field of the Invention

Ceramic aerogels are among the most highly porous and lowest density materials. Their high porosity means that 95% or greater of the total bulk volume of a ceramic aerogel is occupied by empty space (or air), producing excellent thermal as well as sound insulating qualities. In addition, their high specific surface area (e.g. on the order of 600-1000 m$^2$/g) should make them well suited for numerous applications, including as adsorbent beds for chemical separations, as catalyst supports, as platforms for solid state sensors, etc. Unfortunately, conventional ceramic aerogels are physically and hydrolytically very unstable and brittle. Their macro-structure can be completely destroyed by very minor mechanical loads or vibrations, or by exposure to moisture. In addition, over time, these materials tend to produce fine particles (dusting) even under no load. Consequently, there has been little interest in ceramic aerogels for the above-mentioned as well as other applications, despite their excellent properties, simply because they are not strong enough to withstand even minor or incidental mechanical stresses likely to be experienced in practical applications. To date, such aerogels have been used almost exclusively in applications where they will experience no or almost no mechanical loading.

2. Description of Related Art

U.S. Patent Application Publication No. 2004/0132846, the contents of which are incorporated herein by reference, describes an improvement wherein a diisocyanate is reacted with the hydroxyl groups prevalent on the surfaces of secondary ($\phi$ 5-10 nm) particles of a silica aerogel to provide a carbamate (urethane) linkage. Additional diisocyanate monomers are further polymerized to produce a network of polyurea chains between the carbamate linkages of respective pairs of hydroxyl groups present on the secondary particles, resulting in a conformal polyurea/polyurethane coating over the silica backbone. The resulting structure was found to have only modestly greater density than the native silica gel (2-3 times greater), but more than two orders of magnitude greater mechanical strength, measured as the ultimate strength at break for comparably dimensioned monoliths. The present invention provides further improvements beyond what is disclosed in the 2004/0132846 publication.

SUMMARY OF THE INVENTION

A structure is provided, having a solid-phase three-dimensional network of ceramic oxide particles. The particles have non-hydroxyl functional groups bound to surfaces thereof, and the network of ceramic oxide particles is cross-linked via organic polymer chains that are attached to the particles via reaction with at least a portion of their surface-bound non-hydroxyl functional groups.

A method of preparing a polymer cross-linked ceramic oxide network also is provided. The method includes the steps of preparing a solid-phase, three-dimensional ceramic oxide network that is mesoporous and has non-hydroxyl functionality provided over internal surfaces of the network, and reacting at least a portion of non-hydroxyl functional groups attached to those internal surfaces with an organic polymer or polymerizable species to attach the polymer or polymerizable species to the internal surfaces of the ceramic oxide network.

A structure also is provided, having a solid-phase three-dimensional network of ceramic oxide particles that have functional groups bound to surfaces of the particles. The network of ceramic oxide particles is cross-linked via organic polymer chains that are attached to the particles via reaction with at least a portion of the surface-bound functional groups. The ceramic oxide has the form $ZO_x$ where 'Z' is a metallic or semimetallic element other than silicon.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5 is a graph plotting the densities of the thirty-three epoxy cross-linked silica aerogel monoliths made and described in EXAMPLE 1. Also shown in the graph is a line indicating the density of conventional, uncross-linked silica aerogel. Density values (the ordinate axis) are given in units of g/cm$^3$.

FIG. 6 is a graph plotting the ultimate strength (stress at break) for the thirty-three monoliths made and described in EXAMPLE 1. Also shown in the graph is a line indicating the ultimate strength of conventional, uncross-linked silica aerogel.

FIG. 7 is a graph plotting the elastic modulus for the thirty-three monoliths made and described in EXAMPLE 1. Also shown in the graph is a line indicating the elastic modulus of conventional, uncross-linked silica aerogel.

DETAILED DESCRIPTION OF PREFERRED EMBODIMENTS OF THE INVENTION

Aerogels are made by extracting liquid from a solvent-filled gel, to leave behind just a solid-phase three-dimensional network of ceramic oxide particles. The wet gel generally is composed of the solid-phase ceramic oxide network of particles just mentioned, whose vast pore network is filled and occupied by a liquid phase material. The liquid phase material typically comprises or constitutes the solvent, other ancillary species (water, catalyst, initiator, buffer, etc., if present) and any remaining reactant species for forming the network of ceramic oxide particles via the sol gel process. Essentially, one can think of a wet gel and its cognate aerogel as the solvent-saturated solid network of ceramic oxide particles and the dried ceramic oxide network once the solvent has been extracted, respectively.

Figure 1:
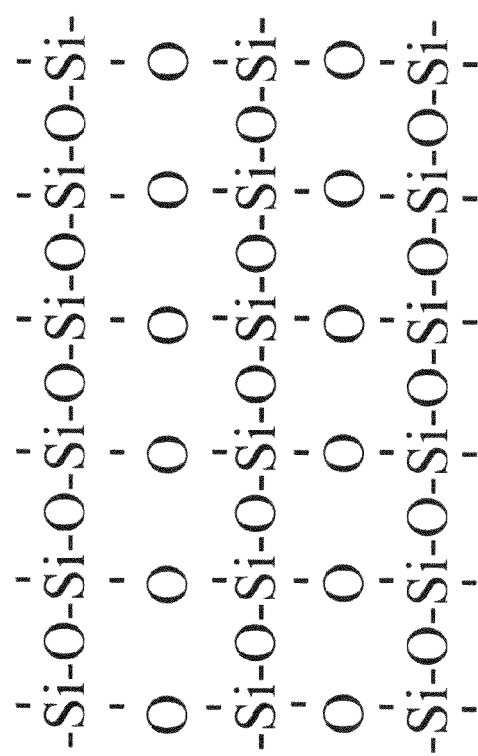
FIG. 1 is a simplified diagram of the structural formula for silica, illustrated in only two dimensions.

A ceramic oxide is an inorganic compound formed between a metallic or a semimetallic element and oxygen; e.g. silica ($SiO_2$), titania ($TiO_2$), alumina ($Al_2O_3$), etc. Generally, a network of ceramic oxide particles comprises a three-dimensional structure, with individual nanoparticles consisting of atoms of the metallic or semimetallic element(s) linked to one another via interposed oxygen atoms. For example, the network structure for silica is illustrated schematically in FIG. 1, though only in two dimensions. Because each silicon atom has four free valences, each is linked to four oxygen atoms. Correspondingly, because each oxygen atom has two donor electron pairs, each of them is linked to two silicon atoms, except for oxygens on the surface which are linked to one silicon and one hydroxyl group. The resulting chemical composition of the nanoparticles is near to $SiO_2$. It will be recognized and understood that other metallic or semimetallic elements having valences other than +4 (such as silicon) will result in correspondingly different chemical compositions in the network of nanoparticles. For example, aluminum has a valence of +3, resulting in the empirical formula $Al_2O_3$ for the corresponding ceramic oxide network. Beyond the foregoing, the only practical constraints for producing a ceramic oxide aerogel are that the metallic or semimetallic element must have a valence of at least, and preferably greater than, +2, and it must be amenable to forming a highly porous three dimensional network of nanoparticles comprising interposed oxygen bonds, e.g. via a sol gel process through reaction of appropriate ceramic oxide precursor species as hereinafter described. Alternatively, other mechanisms to producing such highly porous ceramic oxides can be used.

As evident above, a silica aerogel is prepared by extracting from the pore structure of the solid silica network of nanoparticles the solvent in which that network was made ("gelled"). The three-dimensional network of nanoparticles and the solvent within its pore structure are collectively referred to as a wet gel, also noted above. Briefly, a silica wet gel is made when an alkoxysilane (typically tetramethylorthosilicate or 'TMOS') is hydrolyzed in an appropriate solvent, typically methanol, ethanol, acetone, tetrahydrofuran or acetonitrile, to produce the resulting silica gel network and an alkyl hydroxide byproduct. The byproduct is methanol when TMOS is used. Alternatively, tetraethylorthosilicate or 'TEOS' also can be hydrolyzed to produce a silica gel network, in which case the alkyl hydroxide byproduct will be ethanol. The silica particles are formed through the linkage of silicon atoms in the solution ("sol") via oxygen radicals formed through hydrolysis and condensation. Thus, the silica gel is formed when the nanoparticles become numerous and coagulate against each other into a solid three-dimensional network. The gellation to produce the silica network is a form of cross-linking, wherein silica particles are 'cross-linked' via Si—O—Si linkages in neck regions between particles. However, the term 'cross-link' and cognates thereof are reserved herein for other polymeric linkages between particles described hereinbelow.

Figure 9:
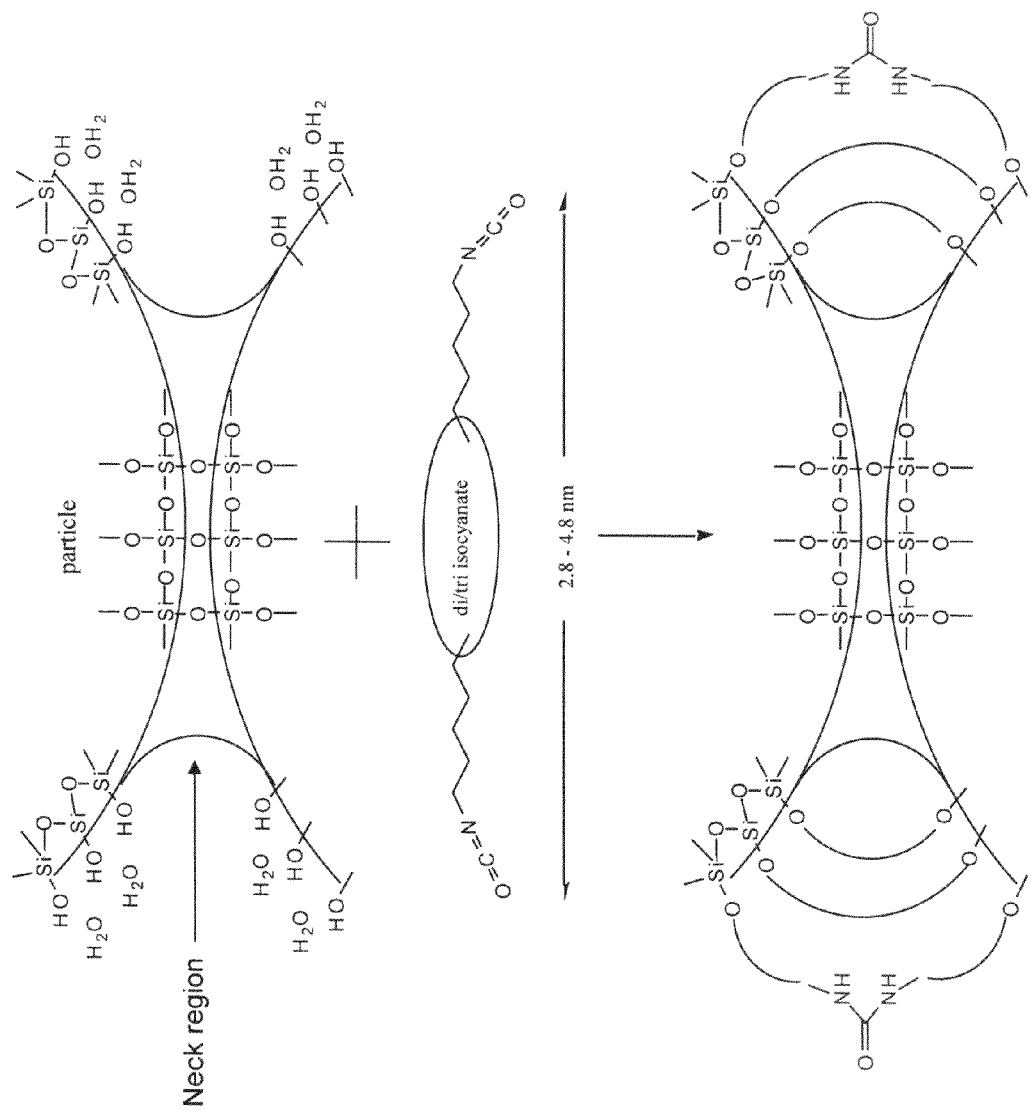
FIG. 9 illustrates two adjacent secondary silica particles linked at a neck region therebetween, and a reaction mechanism for reinforcing the neck region via an isocyanate cross-linking architecture from native surface-bound hydroxyl groups on the respective particles.

The hydrolysis reaction of the silicon alkoxide is spontaneous, but it occurs too slowly for practical applications (gellation can take days or longer to occur). Hence, it is conventional to employ an acid or a base catalyst, e.g. an amine catalyst, to accelerate the reaction to a more practical rate. On hydrolysis and condensation, the resulting solid silica network is formed having at least two distinct classes or orders of particles, namely primary particles with densities of 1.7 to 2.2 $g/cm_3$ and secondary particles with densities about half of that of the primary particles. The primary silica particles are tightly packed, fully dense solid particles having a particle size of less than 2 nm. The secondary particles have a particle size on the order of 5-10 nm, and are microporous, in that they are each made up of an agglomeration of the smaller primary particles. The micropores in the secondary particles are provided as the space between the agglomerated primary particles that make up each secondary particle. The secondary particles are arranged to provide an interconnected network of long strands of the secondary particles to form a mesoporous structure, which strands are often referred to and known as a "pearl necklace" configuration. Within each such strand, secondary particles are linked with adjacent particles via Si—O—Si bonds across relatively narrow 'neck regions' between the particles. (See FIG. 9, described below). The empty space between the pearl necklace strands of secondary particles is referred to as mesoporocity and accounts for up to 95% of the total volume of the solid network's macrostructure, which is what affords these gels their desirable properties.

Once the solid silica network is formed, it is necessary to extract the solvent from the pore system (meso- and micropores) of the solid network. Historically, this had been difficult to achieve while maintaining the structural integrity of the silica gel due to the presence of the mesopores in the solid network. The liquid-vapor interface produced on evaporation of liquid within the mesopores would exert strong surface tension forces that cause the collapse of the pore structure, causing the solid gels to fracture or shrink, often considerably compared to their initial size and form. To solve this problem, the solvent in the pore system of a silica wet gel is exchanged with liquid carbon dioxide above its vapor pressure. The resulting sol gel, now having liquid $CO_2$ in the pore system, is heated and pressurized beyond the critical temperature and pressure of $CO_2$, thus supercritically gasifying the $CO_2$ within the pore system of the solid gel network all at once. The supercritical carbon dioxide is vented, leaving behind the solid silica gel network, thereby producing a dried silica aerogel whose physical structure is substantially unchanged and undamaged compared to the parent wet gel form. Converting the liquid $CO_2$ directly into supercritical $CO_2$ prior to venting results in there never being a liquid-gas interface in the mesopores of the gel; hence no surface tension forces are exerted on the pore surfaces and the solid structure remains intact.

Other aspects and characteristics of sol gel chemistry, and the process of producing a silica wet gel, and from it a silica aerogel via supercritical $CO_2$ venting, are known in the art, and are explained in detail in the aforementioned U.S. patent application publication. The brief overview presented here is summary in nature, and will provide a background from which to understand various embodiments of the invention, described below.

According to a first embodiment, a functionalized ceramic oxide, such as a functionalized silica, is produced having non-hydroxyl functional groups decorated over surfaces of the ceramic oxide network. By 'non-hydroxyl functional group,' it is meant that the functional group in question is not simply —OH; the functional group can be a more complex moiety that comprises one or more —OH groups. This is not meant to imply the ceramic oxide will have no hydroxyl groups on network surfaces, as surface hydroxyls are native to ceramic oxides. Rather, a portion of the surface-bound hydroxyls are replaced with other, non-hydroxyl functional groups. These non-hydroxyl functional groups then are linked to polymeric or polymerizable species via a suitable reaction mechanism to produce a polymeric chain linking structure. The polymeric chain linking structure includes a network of polymer chains attached to at least one surface-bound non-hydroxyl functional group. The chain linking structure also includes polymer chains attached at either end to different non-hydroxyl functional groups decorated over the ceramic oxide surfaces. In addition, individual polymer chains can be linked to one another via branched chains. In the case of silica, which has a mesoporous macrostructure composed of long interconnected strands of secondary particles (which in turn are composed of smaller primary particles) as noted above, the result is to produce a substantially conformal coating over the surfaces of the secondary particle strands. The conformal coating is composed of the polymer that is used to link the surface-bound non-hydroxyl functional groups. The resulting structure, composed of a ceramic oxide backbone coated with a conformal polymeric coating, has only modestly greater density (and lower porosity) than the native ceramic oxide but one to two orders of magnitude greater strength. Hence, highly porous ceramic oxide aerogels now can be made that are strong enough to withstand anticipated mechanical loads for numerous practical applications without collapsing or producing dust.

The description that follows is provided primarily with respect to the preparation of a cross-linked silica aerogel. However, it will be understood by persons of ordinary skill in the art that other ceramic oxides can be used based on selection of appropriate ceramic oxide precursor species that can be reacted to produce a corresponding ceramic oxide network based on another metallic or semimetallic atom, e.g. Al, V, Ti, Zr, etc.

The mechanically strong, organically cross-linked ceramic oxide aerogels will be best understood through a description of a method by which they can be made. A functionalized ceramic oxide network is prepared preferably through a sol gel process similarly as described above. To introduce the desired (non-hydroxyl) functionality to the ceramic oxide, a functionalized ceramic oxide precursor that is compatible with sol gel chemistry to produce a solvent-filled gel of ceramic oxide network particles via a chemical reaction is copolymerized with an unfunctionalized ceramic oxide precursor via that reaction to produce the particle network. As used herein, an unfunctionalized ceramic oxide precursor is a species composed of a metallic or semimetallic element bound to other moieties all through bonds that are labile and subject to being broken under the conditions of the particular reaction that is or will be used to produce the ceramic oxide particle network of the wet gel (sol gel process); i.e. reaction-labile bonds. Conversely, a functionalized ceramic oxide precursor is a species composed of a metallic or semimetallic element that is bound to at least one non-hydroxyl functional group via a bond that is not labile (not subject to being broken) under those reaction conditions (i.e. non-reaction-labile), in addition to at least one, preferably more than one, other moiety via a bond that is labile under those conditions. As the particular chemical reaction proceeds, the solid network of nanoparticles is formed through copolymerization of both the functionalized and unfunctionalized precursor species to produce a ceramic oxide wet gel having the desired non-hydroxyl functional groups attached to the network, in addition to the surface-bound hydroxyl groups that are native to ceramic oxides. As will be seen, at least a portion (probably a significant proportion) of the non-hydroxyl functional groups are surface-bound on the secondary ceramic oxide particles, probably displacing (taking the place of) a proportionate number or quantity of hydroxyl groups.

Next, these functional groups are linked to other polymerizable or polymeric organic species to "cross-link" the ceramic oxide network via organic polymer chains. Finally, the wet gel comprising the cross-linked ceramic oxide network is dried via an appropriate process to produce the final cross-linked ceramic oxide aerogel. This process, described here in summary, will now be more fully described below with respect to silica.

To prepare a cross-linked silica aerogel, first the corresponding silica wet gel is prepared by hydrolyzing an alkoxysilane such as TMOS or TEOS to produce the wet gel having a solid silica particle network similarly as described above. However, in addition to the alkoxysilane, which is an unfunctionalized silica precursor species, a functionalized silica precursor species also is included in the hydrolysis reaction. Like the alkoxysilane species, the functionalized silica precursor species includes a silicon atom bound to at least one, preferably to at least two, most preferably to three, other moieties via a hydrolysable bond (i.e. a bond that is labile under the particular reaction conditions), so the silicon atom can be integrated into the silica network during the hydrolysis reaction, e.g. with TMOS or TEOS. As used herein, a hydrolysable bond is one that is labile and subject to being broken under hydrolysis conditions employed to produce the solid silica network in the presence of water as a reactant, and a suitable catalyst if appropriate, so that the atoms linked by the hydrolysable bond become dissociated from one another. The moieties linked to the silicon (or other metallic or nonmetallic) atom via hydrolysable (labile) bonds are referred to as leaving groups, because following hydrolysis (or whatever the particular sol gel reaction used) they will be dissociated from (they will 'leave') the silicon or other metallic or semimetallic atom, and consequently will not be part of the resulting network.

In addition to the leaving group(s) attached to the silicon atom, the functionalized silica precursor species also has at least one non-hydroxyl functional group attached to the Si atom via a non-hydrolysable (i.e. non-labile) bond. A non-hydrolysable bond is one that is not subject to being broken under the hydrolysis conditions noted above.

The alkoxysilane and functionalized silica precursor species are combined and reacted with water under appropriate hydrolysis conditions described above to copolymerize them and produce a gelled network of silica particles comprising silicon atoms from both of the precursor species. The resulting network is highly porous (volume void fraction of at least 80, preferably 85, more preferably 90, most preferably 95, percent, or higher). It includes the conventional silicon-oxygen linkages for silica gels, but in addition has a plurality of non-hydroxyl functional groups bonded to the silicon atoms that were supplied from the functionalized precursor species.

In one embodiment, the functionalized silica precursor species is 3-aminopropyltriethoxysilane or 'APTES.' Like TMOS, APTES has three alkoxy moieties (ethoxy groups) linked to the central silicon atom via a hydrolysable bond. However, APTES also includes a fourth moiety, a 3-aminopropyl group, that is linked to the silicon atom via a non-hydrolysable Si—C bond. Under hydrolysis conditions, the three alkoxy bonds in APTES are broken and the associated ethoxy groups converted to ethanol. This frees three bonding sites on the silicon atom that now can be linked to oxygen atoms in the silica network, while the latter, fourth bond is not broken during hydrolysis. Consequently, the APTES-source silicon atom will continue to carry the 3-aminopropyl moiety, with the terminal —$NH_2$ functional group, after it is integrated in the silica network. In the case of silica formed from copolymerizing an alkoxysilane and APTES, it has been found the resulting solid network exhibits the same basic hierarchical structure described above, having microporous secondary particles (particle size ~5-10 nm), composed of agglomerations of smaller and highly dense primary particles (particle size ~<2 nm), linked in long interconnected strands to produce an interconnected pearl necklace structure. It has been found that a large portion of the aminopropyl-linked silicons are located at the surfaces of the secondary particles, with the aminopropyl groups decorated over the secondary particle surfaces and extending into the superjacent void space (mesopores). It is noted that in the case of APTES, it is unnecessary to incorporate a separate catalyst into the hydrolysis reaction because the amino groups on APTES provide more than adequate basic character to the sol to catalyze the hydrolysis reaction. In fact, it has been necessary in experiments (described below) to cool the TMOS/APTES solution/water mixture to slow the gellation rate and permit pouring of the sol into a desired mold prior to substantial gellation.

It is believed, and experimental results (also described below) have suggested, that integration of the APTES-source silicon atoms at the secondary particle surfaces is favored compared to intra-particle integration within the silica network. There are several potential explanations for the apparent preference of the aminopropyl-linked silicon atoms to be incorporated into the ceramic oxide network at secondary particle surfaces. First, hydrolysis of the alkoxy groups of APTES is slower than that of TMOS. Also, the primary particles are fully dense, having substantially no porosity. The relatively bulky aminopropyl group ($NH_2$—$CH_2$—$CH_2$—$CH_2$—) would be strongly sterically disfavored compared to the much more compact oxygen linkage (—O—) within the fully dense primary particles. Thus, the APTES-source silicon atoms, having the non-hydrolysable aminopropyl group and therefore one less bonding site compared to the fully hydrolyzed silicon atoms from alkoxysilane, may tend to terminate network growth or linkage. If these silicon atoms were concentrated internally, they might be expected to disrupt gellation and the formation of a uniformly dense and fully expansive solid silica network. Experimental evidence suggests that APTES itself does not gel. Hence both steric considerations and the lack of a fourth bonding site compared to the alkoxysilane-source silicon atoms suggest the APTES-source silicons would be relatively disfavored internally, within either the primary or the secondary silica particles.

However, such constraints are not present at the surfaces of the secondary particles. The secondary particle surfaces define a vast network of relatively large mesopores that easily can accommodate the steric bulk of aminopropyl groups concentrated at and extending from those surfaces. Furthermore, because the secondary particles are linked to one another only in relatively narrow neck regions to form the above-mentioned pearl necklace structure, silica network propagation above the secondary particle surfaces for the most part does not occur, and there is less need for a fourth Si-bonding site. For all these reasons the incorporation of the APTES-source silicon atoms at the surfaces of secondary particles within the silica network may be thermodynamically favored compared to intra-particle integration of these silicons.

Figure 2A:
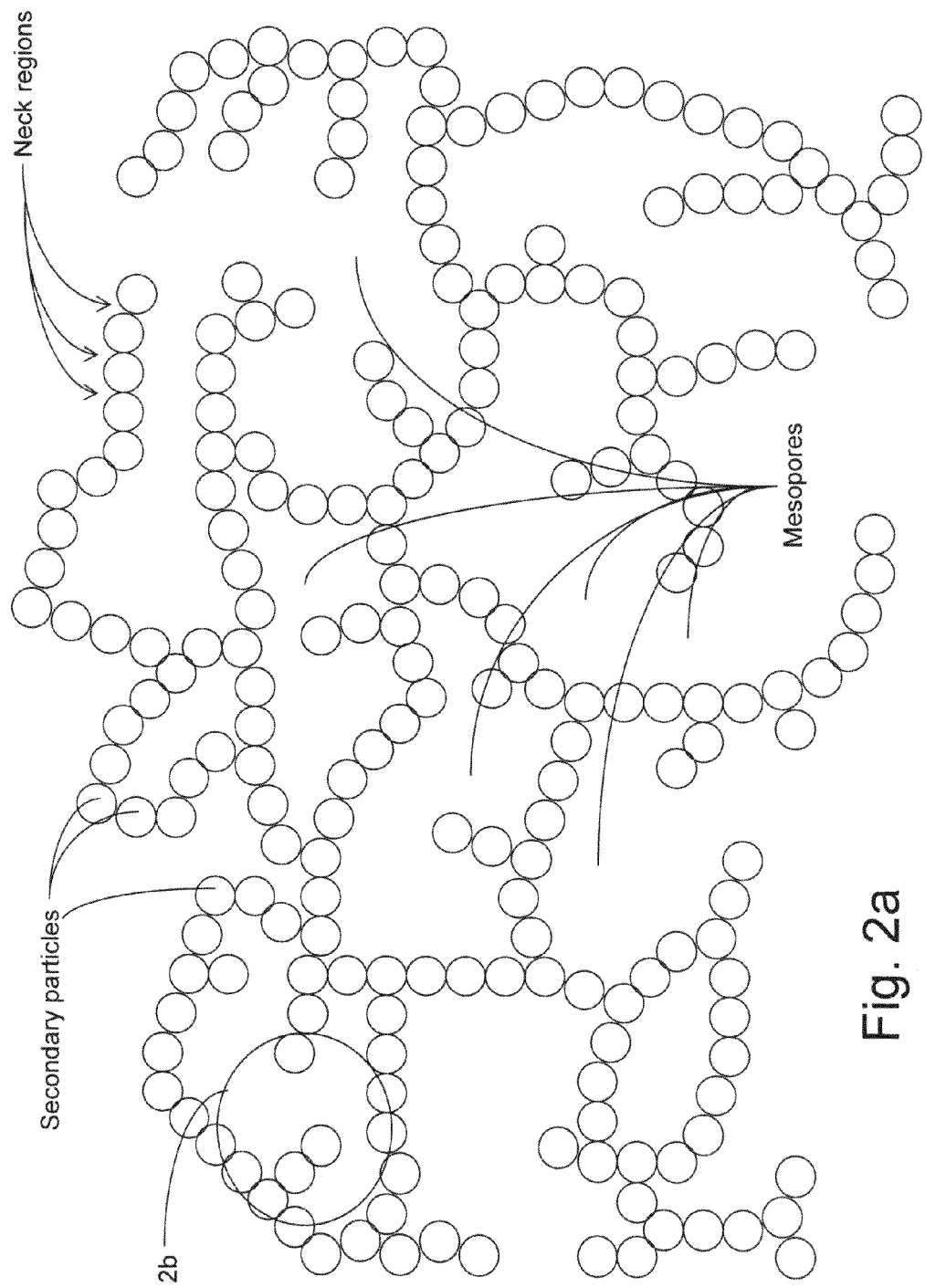
FIG. 2a is a schematic illustration of the structure of a solid silica network, composed of interconnected strands of secondary particles.
Figure 2B:
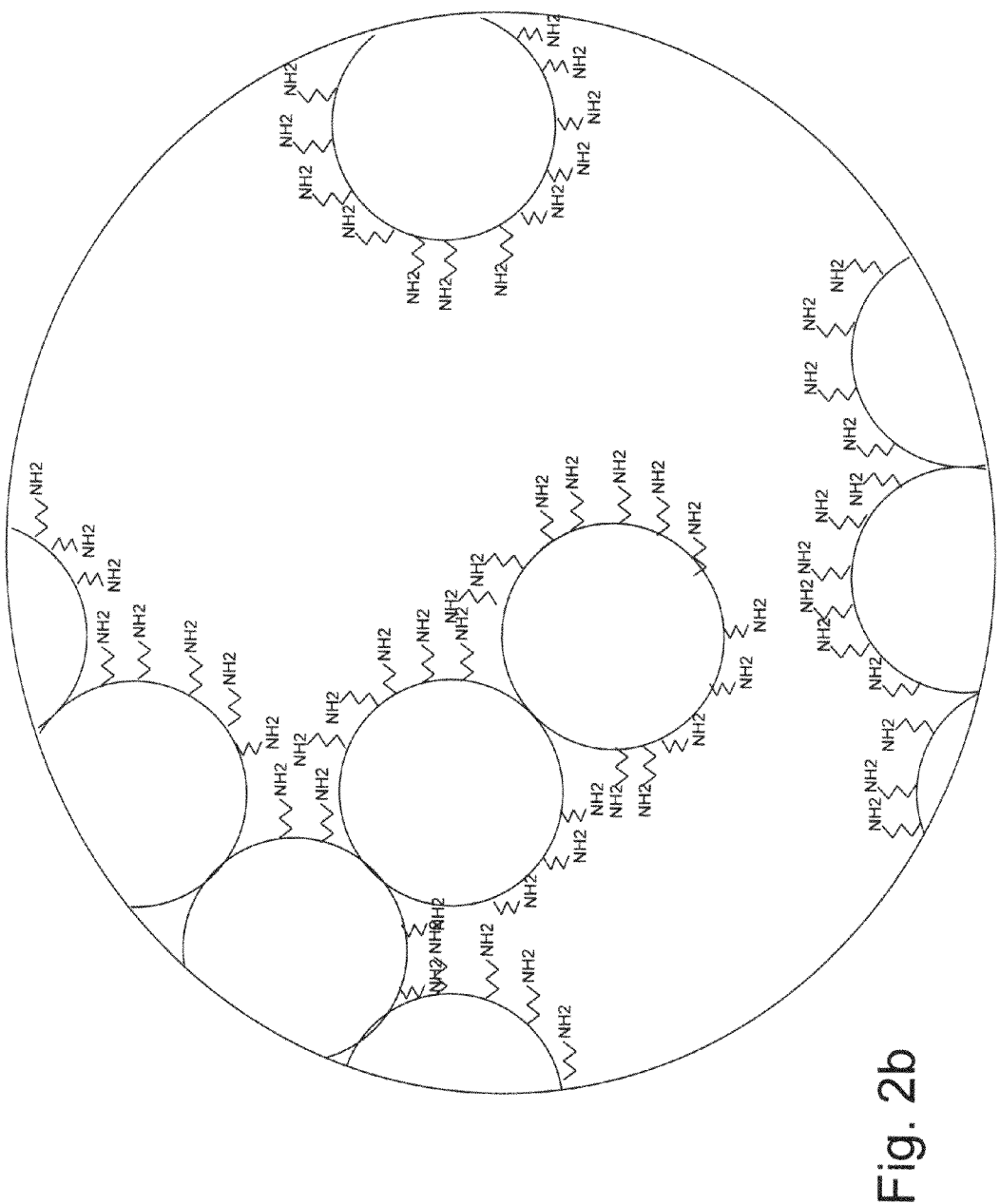
FIG. 2b is a close-up illustration of the portion of FIG. 2a indicated at "2b."

Following hydrolysis of TMOS and APTES as described above, the resulting wet gel framework comprises a solid silica network having a structure illustrated schematically in FIGS. 2a and 2b. (Neither FIG. 2a nor FIG. 2b is drawn to scale, and both are for illustrative purposes only). FIG. 2a is a schematic illustration of the structure of a solid silica network, composed of interconnected strands of secondary particles defining a large mesoporous network. Adjacent secondary particles in a chain are connected to one another (via —Si—O—Si— linkages between the surfaces of adjacent particles) at relatively narrow neck regions as illustrated in the figure. It is believed that the brittleness and low structural strength of native silica aerogels is the result of these neck regions, which may be prone to fracture relatively easily. FIG. 2b is a close-up illustration of several of the secondary particles in FIG. 2a, showing schematically the aminopropyl functional groups extending from the surfaces of the secondary particles. These functional groups remain attached to their respective APTES-source silicon atoms, which now have been incorporated into the silica network at the surfaces of the secondary particles. The number, concentration and arrangement of illustrated aminopropyl groups is not to be taken or interpreted literally, or to convey any information about the actual surface concentration of these groups. The purpose of FIG. 2b is simply to illustrate that the secondary particles are provided having aminopropyl groups decorated over their surfaces as a result of the copolymerization of TMOS and APTES via hydrolysis as described above. Of course, terminal hydroxyl groups also will be present on the surfaces of the secondary particles, however these are not illustrated.

Once the wet gel network having the aminopropyl groups decorated over the secondary particle surfaces has been prepared, the terminal amines can be further reacted with a polymer or a polymerizable species, or other species that can serve as a base for linking or forming a polymer chain to the secondary particle surfaces as part of a polymer cross-linking structure between secondary particle strands in the solid silica network. It is noted that while the solid silica network itself may be considered a polymer produced from the copolymerization of TMOS and APTES, the term 'polymer' is reserved herein to refer to different, preferably organic, polymeric species or chains, non-native to a ceramic oxide network, that link or which are provided to cross-link that ceramic oxide network. The term 'cross-link' and cognate terms such as 'cross-linked,' 'cross-linking' and the like herein refer to linkages composed of polymeric structures non-native to the ceramic oxide network that extend between or link, or which are provided to link, different portions or points within that ceramic oxide network.

Returning to the present embodiment, the functionalized ceramic oxide network resulting from the co-hydrolysis of TMOS and APTES is an amino- (or aminopropyl-) functionalized solid silica network, having amino groups decorated over the surfaces of the secondary particles within the mesopores. At this point, the silica network is in the form of a sol gel whose porous structure is filled with the hydrolysis solvent, hydrolysis reaction byproducts (such as MeOH from TMOS, EtOH from the ethoxy groups of APTES as well as from TEOS if used, etc.) and other unconsumed species.

To produce a polymer cross-linked wet gel, the functional (amino) groups on the surfaces of the secondary particles are reacted with an appropriate monomer or other species for forming or linking to a compatible polymer chain. For example, a diisocyanate can be linked to the terminal amino groups on the surfaces of the secondary particles via a urea linkage according to equation (1).

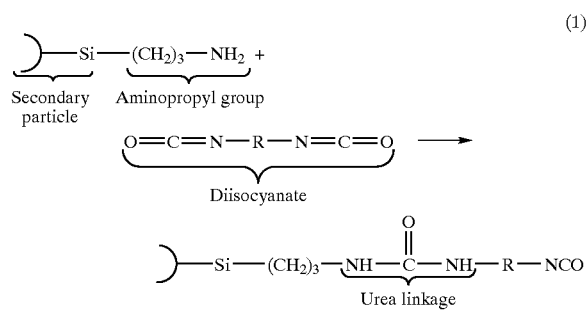

(1)

The resulting terminal isocyanate group, now attached to the secondary particle surface via the urea linkage, can be reacted (polymerized) with additional polyisocyanate groups to produce a polyurea polymer structure, e.g. as in Eq. 2.

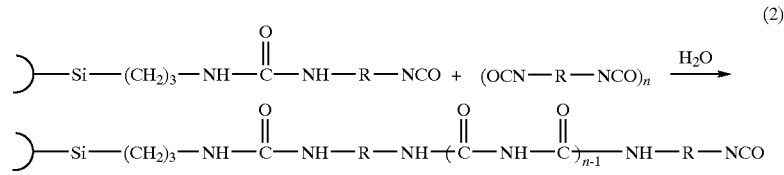

(2)

To drive this polymerization reaction, water adsorbed on the silica surfaces may be sufficient, otherwise water can be added to the sol. The terminal isocyanate group in the product of Eq. 2 above likewise can be reacted with an amino group at the surface of the same or a different secondary particle to produce a polyurea linkage or 'cross-link' between two different secondary particles, for example between adjacent secondary particles in the neck region between them, or between different sites on the same secondary particle, Eq. 3.

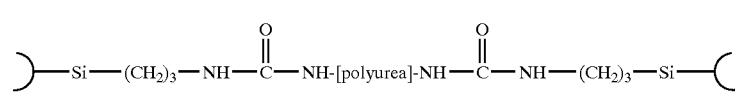

(3)

Alternatively, the above polymerization (cross-linking) reactions can be carried out with an isocyanate that is greater than 2-functional (i.e. having more than two functional NCO groups. For example, 3- and 4-functional isocyanates also can be used. It will be understood that just as in conventional polyurethane chemistry where isocyanates are prevalent, the greater the isocyanate functionality the more highly branched the resulting cross-linking polymeric structure will be, and consequently the more rigid and inflexible the resulting cross-linked ceramic oxide (silica) network. However, in applications where flexibility is of little concern, highly branched cross-linking structures may be desired to impart greater strength to the ultimate silica aerogel product (produced after the cross-linked sol gel is dried). This added strength will come at a cost in terms of a small increase in weight, however, because a more highly cross-linked aerogel will be more dense compared to uncross-linked aerogel.

It is noted that in the above mechanism where isocyanates are used to provide the cross-linking polymer chains, hydroxyl groups present on the surfaces of the secondary particles (terminal silanols) also may react with —NCO groups to produce a carbamate (urethane) linkage:

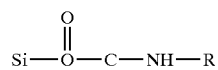

which is more akin to the conventional polyurethane reaction mechanism between polyisocyanates and polyols. However, the linkages formed between polyisocyanate molecules within the polymer chains, more distal from the surface-bound silanol groups, will still be urea linkages as above. Thus, in the present embodiment, polyurea chains may be linked at either end to respective silanol groups (carbamate linkage), amino groups (urea linkage) or one of each. Still further, polyurea chains may be linked only at one end to either a silanol or an amino group, with the opposite end of the polymer chain being unlinked to a secondary particle surface.

In all of the above alternatives, polyurea chains may be linked together via branched polyurea chains, with the degree of branched linkages between the polymer chains depending in part on whether a 2-, 3- or 4-functional isocyanate is used for polymerization. Alternatively, mixtures of polyfunctional (2-, 3- and/or 4-functional) isocyanates also can be used. It will be further recognized there is the potential for additional cross-linking involving further reaction of secondary amine (—NH—) groups in carbamates or polyurea to form tertiary amines (—N<) (allephanates and biurets, respectively), as is common to all polyurethanes.

In the foregoing reactions, 'R' can be any group or moiety to which one or multiple —N=C=O groups can be attached, as the individual case may be. For example, 'R' can be or include a straight or branched alkyl or aryl group, aromatic group, olefinic group, or any combination of this, with or without additional functional species, so long as such additional functional species will not intolerably interfere with the formation of urea linkages between isocyanate groups on different monomers, or between an isocyanate group and a surface-bound amine group in the ceramic oxide network. It is contemplated that 'R' can be provided or designed to impart additional desirable characteristics to the resulting polymer cross-linked ceramic oxide aerogel, for example incorporating additive functional groups as described more fully below.

As a further example, a polyepoxide also can be linked to a terminal amino groups on the surfaces of a secondary particles via an epoxy linkage as shown in Eq. (4).

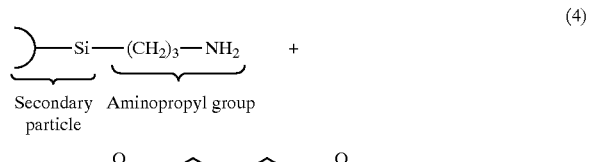

(4)

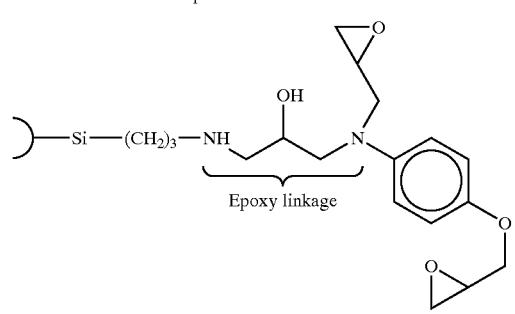

In Eq. 4, a trifunctional epoxide (N,N'-diglycidyl-4-glycidyloxyaniline) is reacted with the terminal amino group at the surface of the secondary particle. This results in a difunctional epoxide moiety attached to a secondary particle surface. Each of the epoxide groups of this difunctional epoxide moiety in the product of Eq. 4 can react (polymerize) with a) a yet-unreacted terminal amino group at the surface of the same or a different secondary particle, the latter resulting in inter-particle cross-linking, or b), at temperatures above 150° C., other epoxide groups attached to the surface of the same or a different secondary particle. An exemplary mechanism involving the difunctional epoxide product in Eq. 4 bound to each of two secondary particles, and a third secondary particle having an as-yet unreacted surface-bound amino group, is illustrated in Eq. 5.

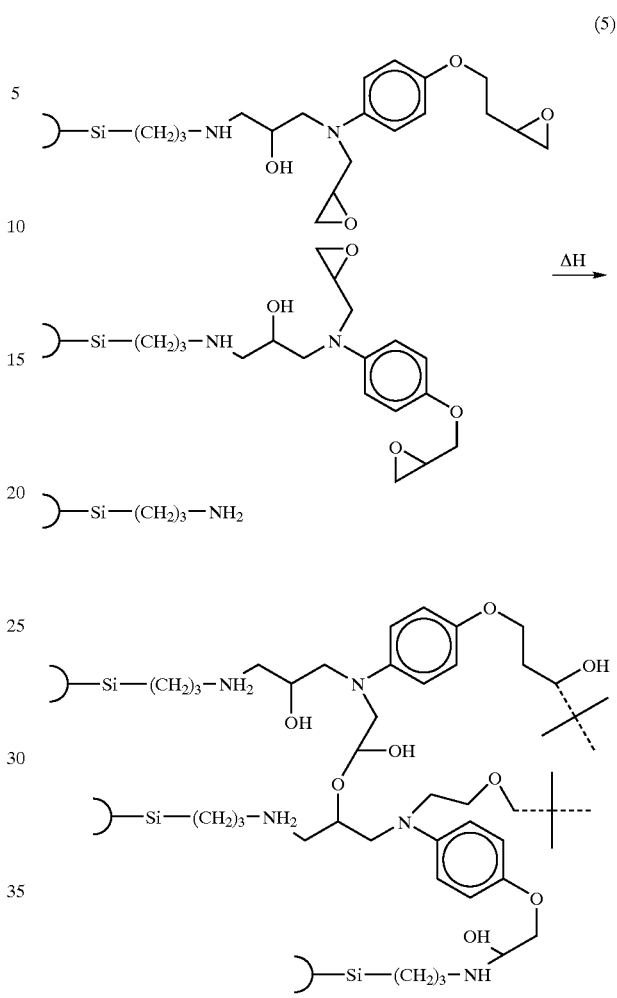

(5)

It will be understood that the exemplary mechanism shown in FIG. 5 is merely illustrative of numerous combinations of epoxide-epoxide and epoxide-amine reactions that are possible to produce a three dimensional polymeric epoxy network structure. In addition, it will be understood that di-, tetra-, or other polyfunctional epoxides also can be used, or combinations of them with each other or with tri-functional epoxides such as the one described above. For example, the following polymer network architecture using 1,3-diglycidyloxybenzene as a difunctional epoxide monomer, Eq. 6, also is within the scope of the invention:

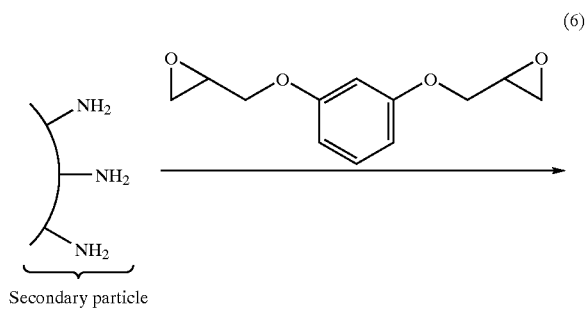

(6)

-continued

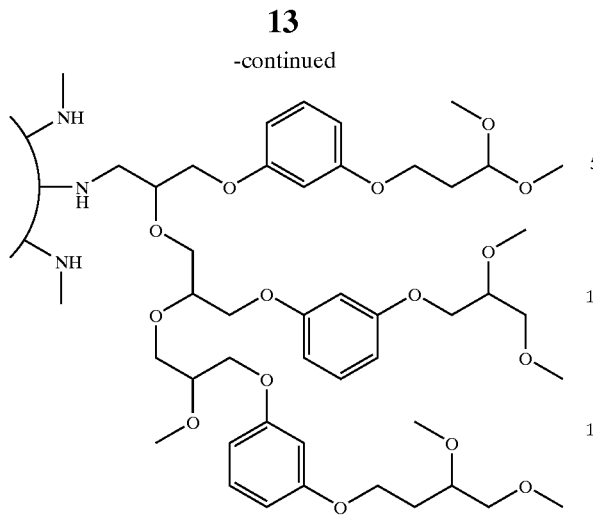

A cross-linked epoxy polymeric network is produced via epoxy linkages between epoxide groups on different polyepoxide monomers (at temperatures above 150° C.), as well as between such groups and surface-bound terminal amino groups within the ceramic oxide particle network. (Epoxies also will react with SiOH surface groups, although to a much lesser extent.) The result is an epoxy cross-linked solid ceramic oxide (silica) network, in the form of a wet gel whose pore structure is saturated with the solvent used to carry out the epoxy polymerization reactions. Analogous with the polyisocyanate network discussed above, an epoxy polymeric network will provide epoxy linkages or 'cross-links' between different secondary particles, for example between adjacent secondary particles in the neck region between them, or between different sites on the same secondary particle. At elevated temperatures or in the presence of catalyst, branched epoxy linkages between epoxy polymer chains are also possible. Under conditions that have been employed to produce the epoxy cross-linked silica networks described here (no catalyst and relatively low temperatures), epoxides do not typically form large networks or chains of epoxy oligomer (monomer). Hence, under these conditions the resulting epoxy cross-linked silica network is primarily an epoxy monolayer over the surface of the secondary particle strands (pearl necklaces).

The foregoing discussion has been provided with respect to several specific di- and tri-functional polyepoxides. However, it will be understood that other polyfunctional epoxides having the general form:

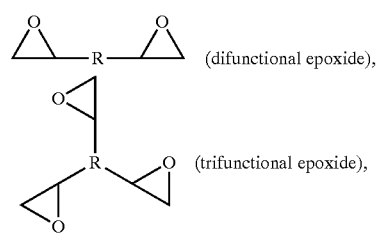

-continued

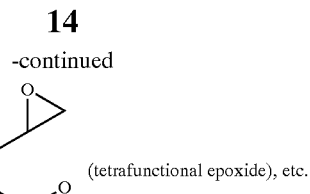

(tetrafunctional epoxide), etc.

also could be used, where 'R' is or can be or include any structure compatible with the epoxy cross-linking chemistry, similarly as described above.

In still a further example of another polymeric cross-linking architecture, a styrene-containing species also can be linked to the terminal amino groups on the surfaces of the secondary particles via an appropriate linkage. The attached styrene group then can be reacted (polymerized) with other styrene-containing monomers to produce a polystyrene cross-linked polymeric network. For example, Eq. (7) below illustrates a reaction for attaching a styrene group to a surface-bound terminal amino group attached to a secondary particle of the ceramic oxide network.

(7)

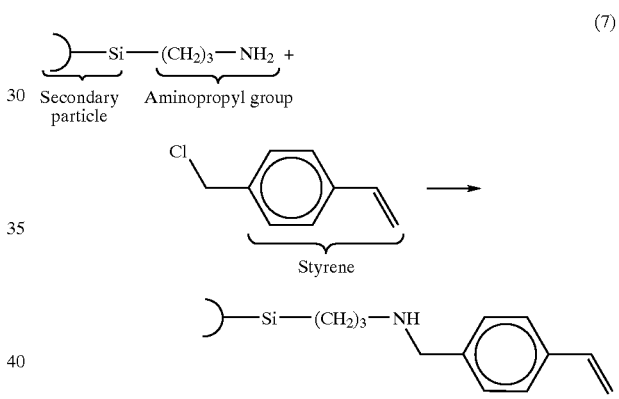

In Eq. 7, the styrene-containing species used to attach the styrene group to the terminal amine is 4-vinylbenzyl chloride, which contains a styrene moiety as shown in Eq. 7. This species is convenient because the terminal chloride reacts readily with the amine to link the amine and the residual p-methylstyrene moiety, producing HCl as a byproduct. In addition, other suitable styrene-containing species, having other functional groups that will react with the amino group to attach the styrene group to the ceramic oxide, can be used, (styrene functionalized epoxides, etc.). However, the preferred method is to co-polymerize p-trimethoxysilyl-styrene with TMOS, analogously to the copolymerization of APTES (though amine catalyst is necessary) to apply the styrene moiety directly to the surface of the nanoparticles.

Once styrene groups have been bound to internal surfaces of the solid ceramic oxide network, they can be reacted (polymerized) with other styrene monomers to produce a polystyrene cross-linked polymer network, for example as illustrated in Eq. 8. The styrene functionalized gels are placed into solutions containing the monomers of choice and AIBN as the initiator, and the polymerization occurs at elevated temperatures such as 75° C., or 75° C. to 100° C.

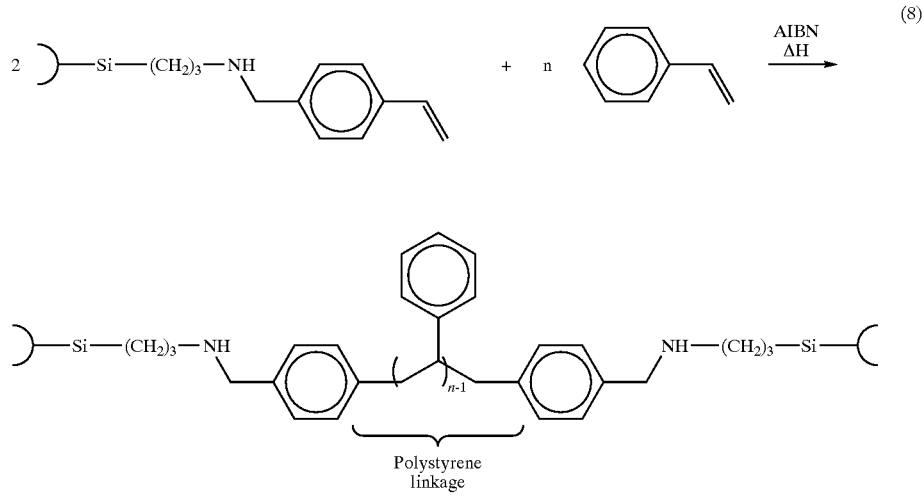

It will be understood that Eq. 8 is merely illustrative of a possible polystyrene cross-linking mechanism using native, non-functionalized styrene monomer to provide the polymeric cross-links. The actual cross-linked polystyrene network produced through polymerization of styrene monomers will include polystyrene chains of varying length depending on the concentration of additional monomer, extending between amino groups at the surfaces of different secondary particles, as well as between such groups attached to the surface of the same secondary particle. As with the previously described cross-linking species, polystyrene chains also may be provided between two adjacent secondary particles linked at a neck region therebetween in the same strand, as well as between different secondary particles in the same or in different strands. Also, alternatively to non-functionalized styrene monomer, other functionalized styrene-containing monomeric species (e.g. of the form R-[styrene], or R-[styrene]$_n$ also could be used. Similarly as before, 'R' can be or include any structure compatible with styrene polymerization to produce a polystyrene cross-linking architecture.

Examples of styrene-containing monomeric species that have been successfully used to produce polystyrene cross-linked silica aerogels are 4-vinylbenzyl chloride and pentafluorostyrene, as well as mixtures thereof (see EXAMPLE 3). It will be understood that to produce a branched polystyrene network, it may be necessary or desirable to incorporate at least some functionalized styrene-containing monomers, or otherwise monomers containing at least two styrene groups. Otherwise, pure, non-functionalized styrene may produce primarily straight and unbranched polystyrene chains as known in the art.

Also, generally it is desirable to utilize a radical initiator species to induce styrene polymerization. In the mechanism illustrated in Eq. 8, azobisisobutyronitrile (AIBN) is employed as a radical initiator. However, other suitable radical initiators can be employed, e.g. peroxy-based initiators including benzoyl peroxide can also be utilized under similar thermal conditions to obtain the polymerization.

As a further example, a polyamic acid also can be linked to terminal amino groups on the surfaces of the secondary particles via an anhydride linkage as shown in Eq. (9).

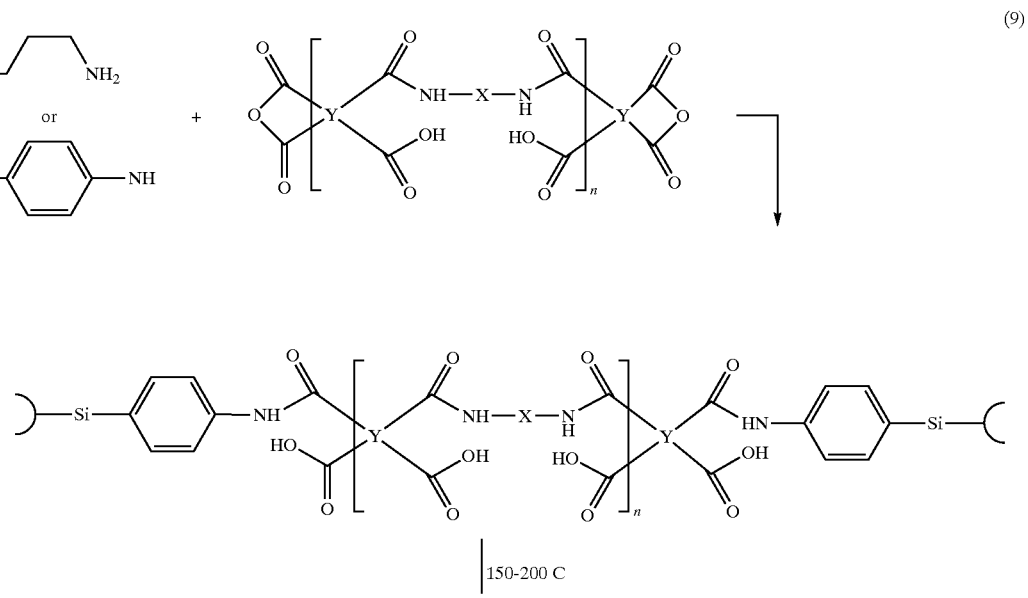

-continued

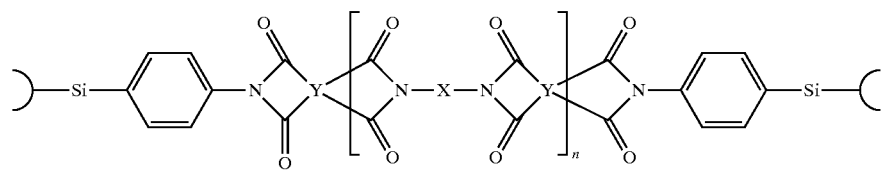

Examples of X and Y:

X: 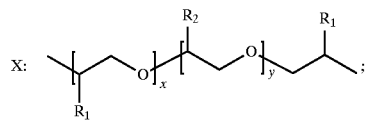 ;

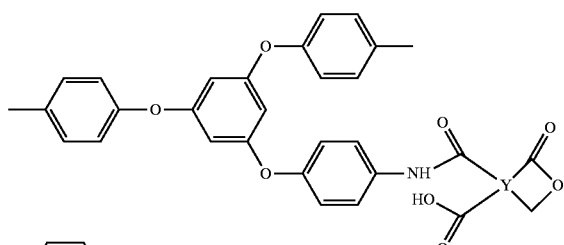

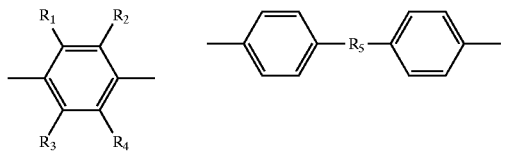

Y: 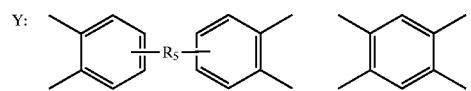

$R_1$ = H, $CH_3$, $CF_3$, alkyl, phenyl; $R_2$ = H, $CH_3$, $CF_3$, alkyl, phenyl
$R_3$ = H, $CH_3$, $CF_3$, alkyl, phenyl; $R_4$ = H, $CH_3$, $CF_3$, alkyl, phenyl
$R_5$ = nil, carbonyl, hexafluoroisopropylidene, methylene, oxygen
$R_6$ = nil, carbonyl, hexafluoroisopropylidene, methylene, oxygen In Eq. 9, a polyamic acid terminated with anhydride is reacted with terminal amino groups at the surface of the secondary particles. This results in amic acid moieties attached to secondary particle surfaces. Each of the anhydride groups shown in Eq. 9 can be reacted (polymerized) with a yet-unreacted terminal amino group at the surface of the same or a different secondary particle. Subsequent heating at temperatures of 150-200° C. promotes imidization giving a thermo-oxidatively stable cross-link. Incorporation of a tri-functional amine in the polyamic acid as shown in Eq. 10 allows n attachments of surface amines to anhydrides along oligomer backbones.

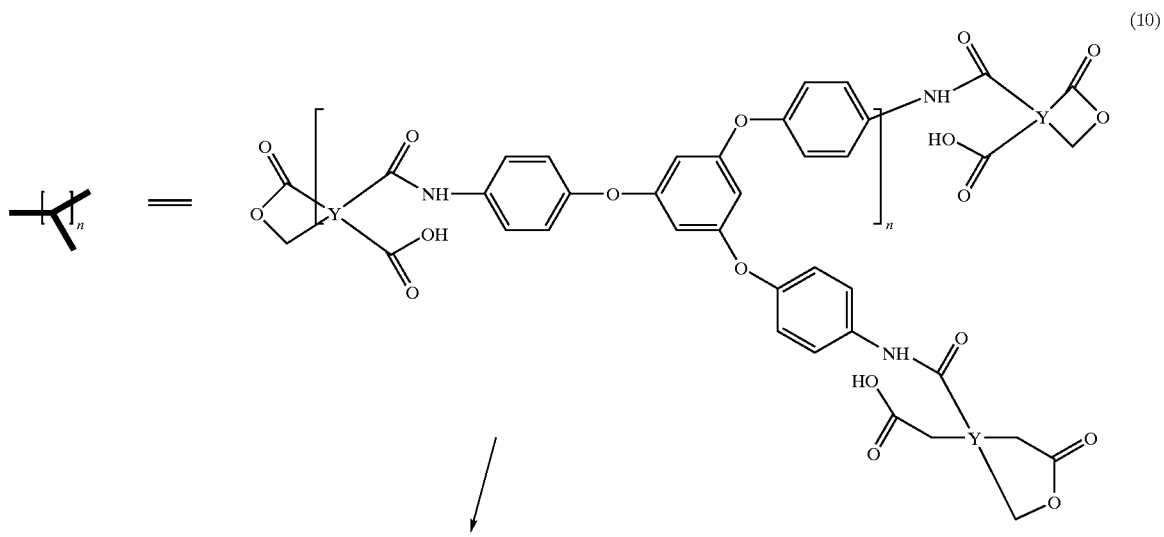

(10)

-continued

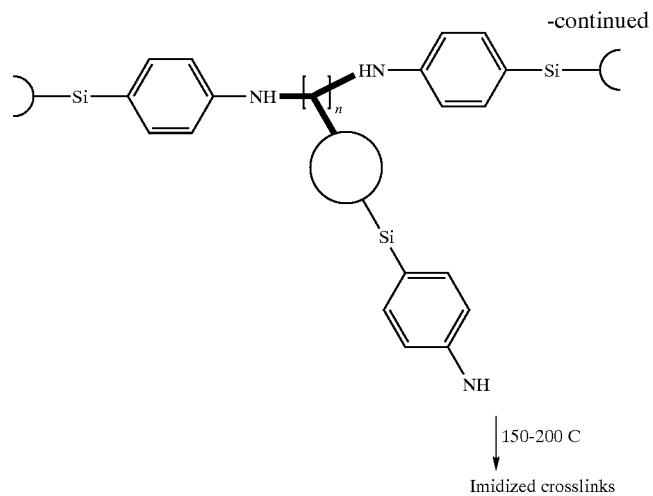

Imidized crosslinks

In addition to cross-linking the ceramic oxide via the isocyanate-, epoxy- and styrene-based polymer chains described above, other polymer architectures also could be used for cross-linking. The first step will be to select an appropriate base species or monomer to be attached to the ceramic oxide to support the desired polymer architecture. For example, a moiety including a free carboxylic acid group can be attached to the ceramic oxide if it is desired to produce a polyester cross-linking architecture. Alternatively, other functional groups also could be decorated to the ceramic oxide network, such as other olefins (polyolefin cross-linking architecture), alkyl or aryl halides (polybenzoxazole cross-linking), ketones or aldehydes (polybenzimidazole cross-linking), ethers (polyether cross-linking), etc. It should be evident that once the appropriate base or monomeric species has been decorated to the ceramic oxide network's internal surfaces, cross-linking is a matter of performing essentially the conventional cross-linking reactions, using conventional reaction conditions, associated species (such as catalysts and initiators), solvents, etc., with care taken to select conditions, solvents, etc. compatible with the solid ceramic oxide network. However, except for terminal hydroxyl groups, ceramic oxides are highly stable, inert materials, so there will be few instances where selection of appropriate cross-linking species and/or conditions will be impacted by the particular ceramic oxide sol gel to be polymer cross-linked.

It also will be evident that attachment of the desired base or monomeric species to the ceramic oxide network, e.g. to decorate the particle surfaces of such network with the functional groups that will support the desired cross-linking chemistry, will be a matter of routine based on the present disclosure. Broadly, one selects or designs a molecule having the desired reactive species to support cross-linking via the desired architecture, but also having another reactive site that can be used to attach the molecule (having the reactive species) to the ceramic oxide network. In the case of amine-decorated silica as above, the mentioned functional group is an amine, and the other reactive site is an (or more than one) alkoxysilane(s), e.g. three ethoxysilyl groups on APTES. Alternatively, if the native hydroxyl groups on ceramic oxide surfaces are to be used, then the reactive site should be reactive with such terminal hydroxyl groups to produce an analogous result. It will be understood that the cross-linking supportive functional group and the other reactive site to attach the molecule to the ceramic oxide network can be the same (as for the polyfunctional epoxides described above), or they can be different (as for 4-vinylbenzyl chloride, also described above).

Still further, the above cross-linking methods are not to be limited to silica ($SiO_2$), as the methods and reactions described herein to produce a cross-linked ceramic oxide are also applicable to other ceramic oxides. For example, the methods and reactions described herein also could be used to produced other polymer cross-linked ceramic oxides, including but not limited to titania, vanadia, manganesia, zirconia, ruthenia, alumina, iron oxide, india (indium oxide), yttria, europia, etc., (which can be represented as $TiO_x$, $VO_x$, $MnO_x$, $ZrO_x$, $RuO_x$, $AlO_x$, $FeO_x$, $InO_x$, $YO_x$, $EuO_x$, etc., respectively). All of these ceramic oxides will have terminal hydroxyl groups present on internal surfaces thereof, which form the respective ceramic oxides and define their mesoporous networks. Accordingly, all of these, as well as other ceramic oxides, can be cross-linked as described herein by using the surface-bound hydroxyl groups to attach the desired moiety to support the chosen cross-linking architecture. Alternatively, other ceramic oxides besides silica also can be produced having non-hydroxyl functional groups decorated to the internal surfaces thereof. Specifically, such other ceramic oxides can be produced via appropriate reactions analogous to the TMOS-APTES hydrolysis reaction for producing amine-decorated silica, with suitable ceramic oxide precursors based on the associated metallic or semimetallic element, "Z," having leaving groups attached to a central Z atom via reactive or reaction-labile bonds, and functional groups attached via non-reactive or non-reaction-labile bonds. For example, an alkoxy-Z and a functionalized $ZO_x$ precursor species, (a generic ceramic oxide being represented as $ZO_x$), having at least one functional group attached to the Z-atom via a non-reactive bond can be prepared by persons having ordinary skill in the art for the desired metallic or nonmetallic "Z" atom, and copolymerized via a sol gel process employing an appropriate reaction for producing a gelled ceramic oxide network decorated with the desired functional group. Alternatively, the ceramic oxide mesoporous network can be decorated with appropriate functional groups by post-gellation treatment with molecules having the desired functional groups that will support cross-linking via the desired chemistry, but also having another reactive site that can be used to attach the molecule (having the reactive species) to the ceramic oxide network. In that regard, such reactive site that can be used to attach said molecule to the ceramic oxide network can be based on the same metallic or semimetallic element "Z" as the ceramic oxide mesoporous network, or another element. For example, the mesoporous surfaces of a metallic or semimetallic ceramic oxide mesoporous network can be decorated with amines by post-gellation treatment with APTES, or it can be modified with styrene by post-gellation treatment with p-trimethoxysilyl styrene. It is expected that not all metal and semimetal oxide mesoporous networks will be amenable to all these methods, and it is recognized and expected that some experimentation may be necessary to determine whether functionalized wet gel networks based on other, non-Si metallic or semimetallic elements can be prepared via sol gel chemistry to produce a gelled solid network. In addition, some ceramic oxides may require acid or base catalysis, different reaction conditions such as high temperature for endothermic reactions, low temperature for highly exothermic reactions, appropriate solvents, etc. However, such experimentation is well within the ability of a person having ordinary skill in the art, and will be routine based on the present disclosure once the desired ceramic oxide and the functional groups to be decorated thereto have been identified for producing an aerogel with the desired properties.

Regardless of what polymeric architecture or what ceramic oxide is employed to produce a polymer cross-linked solid ceramic oxide network, the next step is to remove the liquid (solvent) from that network to produce a dried, cross-linked aerogel from the corresponding wet gel. Conventionally, aerogels are prepared from the corresponding wet gel via a $CO_2$ exchange and supercritical drying procedure as described previously. That same procedure can be used for the present cross-linked wet gels to produce the cross-linked aerogel. Alternatively, at least in some cases supercritical drying is not necessary for polymer cross-linked aerogels, as it had been for conventional aerogels, to prevent shrinkage or destruction of the ceramic oxide network on evaporation of the solvent from its pore structure. This is because the cross-linked polymeric network imparts adequate structural strength and support to reinforce the ceramic oxide network and prevent its destruction from surface tension forces generated as the liquid within the pores evaporates. For example, as described in publication No. 2004/0132846, an isocyanate-linked silica sol gel (from native surface-bound hydroxyl groups) has been dried to produce the corresponding aerogel via exchange of the cross-linking solvent with pentane, and then heating to elevated temperature to evaporate the liquid pentane from the pore structure. The same procedure also should apply to the aerogels of the presently described embodiment, wherein a non-hydroxyl functional group is decorated to the ceramic oxide particle surfaces and then used as a base to launch the cross-linking polymer network.

In addition to amine functional groups, other functional groups also can be decorated to the surfaces of ceramic oxide particles to provide a base for polymer cross-linking of the ceramic oxide network, e.g. by incorporation into the functionalized ceramic oxide precursor species mentioned above via a non-reactive or non-reaction-labile bond.

In addition to the polymerizable moieties on the monomeric species used to cross-link the surface-bound functional groups either present or incorporated into a ceramic oxide network, such species also can have other chemical moieties effective to impart a desired property to the finished polymer cross-linked ceramic oxide aerogel composition. For example, any of the aforementioned monomeric species (epoxides, styrenes and isocyanates), as well as other monomeric species capable to support other cross-linking architectures, can have, e.g., attached phosphate group(s), which are known to impart flame retardant qualities to materials. As a further example, conducting polymers having free valence electrons capable to act as charge carriers can be incorporated into the monomeric species to impart a degree of electrical conductivity to the finished aerogel. As a still further example, catalytic species also can be incorporated in this manner. Other groups or moieties capable to impart other desired physical, chemical, electrical, magnetic, non-linear optical or other properties also can be incorporated in this manner, which incorporation would be within the ability of a person having ordinary skill in the art. Such groups that can be so incorporated into the polymer cross-linked aerogels through incorporation in monomeric (polymerizable) species used for cross-linking are broadly referred to herein as 'additive functional groups' because they impart added characteristics to the final aerogel. Alternatively, such groups can be added either by post-gellation treatment, or by post-cross-linking treatment with appropriate attachable molecules.

As will become apparent in the following examples, a mixture of different monomeric species having different overall structures also can be used to produce an aerogel so long as the different monomers have common or compatible polymerizable moieties; e.g. a styrene moiety or an epoxy moiety, etc. For example, the degree of flexibility of a polymer cross-linked ceramic oxide aerogel will depend, among other things, on the prevalence of rotatable bonds in the cross-linked polymer structure. Much rotation is possible for carbon-carbon or carbon-heteroatom single bonds in a polymer chain. Alternatively, higher order (double or triple) carbon-carbon bonds, a high degree of cross-linking as well as aromatic rings in the polymer chain do not permit significant rotation. Consequently, a polymer network composed primarily of highly cross-linked isocyanate (polyurea), or based on highly unsaturated monomers (significant degree of higher order bonds), will produce a relatively rigid, inflexible aerogel. If it is nonetheless desired to produce a more flexible cross-linked aerogel based on isocyanate cross-linking chemistry, then a mixture of polyisocyanate monomers, e.g. one monomer having few or no rotatable bonds and another having longer chains between cross-links, can be used, and their ratio tuned to achieve a desired degree of flexibility. Of course, the total available range of available flexibility may be constrained within broad limits based on the cross-linking architecture selected, but some degree of adjustment should be possible through this technique.

Conversely, a cross-linked network based on epoxy chains, having numerous ether linkages, which permit a high degree of rotation, will be substantially more flexible, and its flexibility may depend on the proportion of ether linkages in the network. Still further, ether linkages can be provided in other, non-epoxy monomers, such as polyisocyanate monomers or polyimides using amine terminated polyalkyleneoxides in the polymer chain as shown in Eq. 9 above, to impart a greater degree of flexibility to the resulting aerogels as described above. At this point, it should be evident that a person having ordinary skill in the art will be able to design a wide variety of cross-linking architectures, based on a variety of polymerizable species, additive functional groups, other structural linkages and moieties within the polymerizable species, etc., to produce aerogels having characteristics suitable to any number of potentially desirable applications. There is virtually no limit to the applications for the potential variety of polymer cross-linked ceramic oxide aerogels that could be prepared by a skilled person based on the present disclosure.

Further aspects of the present invention will be illustrated and understood in the context of the following examples, which are provided by way of illustration and not limitation.

EXAMPLE 1

Epoxy Cross-Linked Silica Aerogels from Amine-Decorated Silica Network

Experiments were conducted to determine the effects of varying the APTES to TMOS ratio for producing an amine-decorated solid silica network that was subsequently cross-linked via an epoxy architecture. Specifically, the APTES to TMOS ratio was varied, and the resulting sol gels were treated with di-, tri-, or tetra-functional epoxides in various concentrations. The reaction conditions (time and temperature) were varied along with the APTES concentration, and the epoxy type and concentration. The resulting cross-linked gels were dried with supercritical carbon dioxide to produce the corresponding aerogels, which were characterized macroscopically, microscopically and chemically. The most distinct property of the polymer cross-linked aerogels was their greatly improved mechanical properties compared to native aerogels. In the present experiments, the strengths of these aerogels were measured as a function of the chemical composition, processing conditions, and resulting density.

Experimental Methods

As noted above, in these experiments di-, tri- and tetra-functional epoxides were used as the cross-linking moieties to produce the epoxy cross-linking architecture. The particular species of each of these epoxides were as follows:

Difunctional epoxide: diglycidylaniline,

Trifunctional epoxide: N,N'-diglycidyl-4-glycidyloxyaniline, and

Tetrafunctional epoxide: 4,4'-methylenebis(N,N'-diglycidylaniline).

Solvents used in the production of cross-linked epoxy aerogels included methanol (ACS reagent grade), tetrahydrofuran (THF:ACS reagent grade), anhydrous tetrahydrofuran (ACS reagent grade purified and dried using a solvent purification system by Innovative Technology, Inc.), and acetone (ACS reagent grade). Supercritical drying was performed using liquid carbon dioxide (standard T type tank with a siphon tube, AGA Inc., Cleveland Ohio).

All of the wet sol gels were prepared by mixing together two solutions, A and B. Solution A contained a variable volume ratio of APTES to TMOS in methanol solvent; solution B contained an equal amount of methanol, the appropriate amount of water, and a gellation catalyst, if necessary. For comparison, wet sol gels without APTES were prepared by using TMOS, deionized water, and methanol in the molar ratio of 1:3:8.5; gellation was catalyzed by adding 6 $\mu$mol of $NH_4OH$ (30%) for every mol of TMOS. Thus, in a typical procedure solution A contained 4.5 mL of methanol and 3.85 mL of TMOS. Solution B contained 4.5 mL of methanol, 1.5 mL of water, and 40 $\mu$L of the $NH_4OH$ solution. Wet gels with APTES were prepared by replacing 25% or 50% v/v of TMOS in solution A with the corresponding volume of APTES. Importantly, in these reactions the base catalyst, $NH_4OH$, was able to be eliminated from the sol gel hydrolysis reaction to produce the solid silica network because the amine group of APTES itself served as the gellation catalyst. In fact, it was necessary to slow down the APTES-catalyzed gellation reaction long enough to allow pouring the sol into the appropriate molds. Thus, solutions A and B were cooled in a dry ice-acetone bath prior to mixing when APTES was included in the hydrolysis reaction. Immediately after mixing the cold solutions, 3.6 mL of each mixture was poured into cylindrical molds approximately 1 cm in diameter and 4 cm in length to form the desired cylindrical monoliths for testing. The molds were covered with Parafilm and the gels were allowed to age for 48 hours to fully form the respective solid silica networks.

Subsequently, the wet sol gels were carefully removed from the molds and washed approximately every 12 hours with methanol (20 mL) a total of four times to remove $NH_4OH$ if present, but was done for the sake of consistency for all gels. The sol gels were then washed four more times every 12 hours, twice with THF (20 mL) and twice with anhydrous THF (20 mL).

Three different volume percent concentrations for each epoxide in anhydrous THF (15%, 45%, and 75% v/v) were used for cross-linking. Because of the high viscosity of the epoxides, dissolution was facilitated with heating at ca. 50° C. and vigorous shaking. Once the solutions were homogeneous, the sol gels were placed into the desired epoxide solution (20 mL), gently stirred, and allowed to equilibrate for 48 h. Subsequently, and while still in the corresponding epoxide solution, wet gels were placed in an oven and allowed to react at specified temperatures (50, 72.5, or 95° C.) and lengths of time (16, 44, or 72 h) as predetermined by a statistical experimental design procedure. Afterward, cross-linked sol gels were allowed to cool to room temperature and each gel was first washed four times with anhydrous THF (20 mL each time) in 12 hours intervals to remove the unreacted epoxide, and then four times with acetone (20 mL each time). After the final acetone wash, monoliths were transferred together with the final acetone wash solution into an autoclave and were dried from supercritical $CO_2$ (40° C. and ~100 bar) to produce the respective dried aerogels.

Chemical characterization of the epoxy cross-linked aerogel monoliths was conducted by infrared, $^{13}C$ NMR, and $^{29}Si$ NMR spectroscopy. The dry aerogel samples were ground by ball-milling for 5 min using a SPEX 5300 Mixer Mill. Solid samples were mixed with KBr and pressed into a pellet, and infrared spectra were obtained with a Nicolet-FTIR Spectrometer Model 750. Solid $^{13}C$ NMR and $^{29}Si$ NMR spectra were obtained on a Bruker Avance 300 Spectrometer, using cross-polarization and magic-angle spinning at 7 kHz. The acquisition also employed spinning-sideband suppression using a CPSELTICS sequence. The solid $^{13}C$ spectra were externally referenced to the carbonyl of glycine (176.1 ppm relative to tetramethylsilane, TMS). The solid $^{29}Si$ spectra were externally referenced to the silicon peak of the sodium salt of 3-trimethylsilylpropionic acid (0 ppm).

Physical characterization of native and cross-linked silica aerogel samples was conducted by thermogravimetric analysis (TGA), scanning electron microscopy (SEM), and nitrogen-adsorption porosimetry. TGA was performed using a TA Instruments Model 2950 HiRes instrument. Samples were run at a temperature ramp rate of 10° C. min-1 under nitrogen or air. Samples for SEM were coated with gold and microscopy was conducted with an Hitachi S-4700 field-emission microscope. For nitrogen-adsorption porosimetry, samples were outgassed at 80° C. for 24 h under vacuum and studies were conducted with an ASAP 2000 Surface Area/Pore Distribution analyzer. Three-point flexural bending tests were performed according to ASTM D790, Procedure A (Flexural Properties of Unreinforced and Reinforced Plastics and Electrical Insulating Materials), using an Instron 4469 universal testing machine frame with a 2 kN load cell and a three-point bend fixture, with 0.9 in. span and 25 mm roller diameter.

Typical samples were cylindrical, ~1 cm in diameter and ~4 cm in length. The crosshead speed was set at 0.04 in. min-1. Three samples were tested for each composition and the average of the three values are presented in Table 1 below.

Dielectric characterization also was conducted by measuring the capacitance of thin (~9 mm diameter, ~1 mm thick) disks. The thin disks were cut from cylindrical monoliths with a diamond wafer blade and saw. The lateral area of each disk was masked with duct tape and the top and bottom surfaces were sputter-coated with gold using a Baltek MED 20 Sputtering System. Copper wires were Scotch-taped on the two surfaces and were connected to an MFJ-259B SWR/RF analyzer running in capacitance-measurement mode. Capacitance measurements were made at three different frequencies (72, 117, and 174 MHz). The average capacitance values were corrected for fringe-field errors. The relative dielectric constant $\in_r$ of each sample was calculated using the corrected capacitance, area, and thickness of the samples. The accuracy of the dielectric constant measurements was checked by measuring the dielectric constant of a known material, Plexiglas. The measured value was 2.2±0.2, while the literature reported value is 2.55±0.13.

Results

Thirty-three different silica aerogels were prepared to study the effects of varying numerous parameters; e.g. using different combinations of APTES:TMOS ratio, type and percent epoxy moiety, and reaction conditions (time and temperature of reaction) for the sol gel hydrolysis reactions as described above. Parameters explored in cross-linking amine-modified silica with polyfunctional epoxides were as follows: the amine concentration on the silica backbone, the chemical identity and concentration of the epoxide in the mesopores, and finally the reaction temperature and time. Due to the poor general solubility of the epoxides in methanol, THF was used as the solvent. (It is noted that several of the previously-described wash steps could be eliminated, thus shortening the sol gel process significantly, if methanol were replaced by THF as the gellation solvent).

The amine concentration on the silica backbone was controlled by the relative ratio of APTES to TMOS in the sol.

Thus, the APTES concentration was evaluated from 0% up to 50% v/v in the total volume of TMOS+APTES. Higher concentrations of APTES did not produce stable gels. For example, using a 3:1 v/v ratio of APTES to TMOS (75% APTES) produced opaque white, gelatinous (as opposed to rigid), and extremely fragile wet gels, while 100% substitution of APTES for TMOS results in sols that fail to gel altogether. Hydrolysis of APTES is a much slower process than hydrolysis of TMOS; thus, one explanation for the gelatinous texture at 3:1 v/v ratio of APTES to TMOS (75% APTES) could be the fact that the amount of TMOS is too small to form stable gels. However, control experiments showed that keeping the relative ratio of APTES/TMOS to 1:3 v/v while reducing the total amount of APTES+TMOS in the sol produced gels even when the total amount of APTES+TMOS was reduced by 20 times. Presumably, high concentrations of APTES in the sol may also result in steric interferences to gellation as mentioned previously. Hence, while it was deemed reasonable that higher concentrations of APTES might yield the most sites for reaction with an epoxide, lower concentrations of APTES might produce a stronger silica framework to build upon.

As noted above, three different epoxides (di-, tri- and tetra-functional) were employed. Three different concentrations of epoxides also were used, varying from 15% to 75% v/v of the corresponding epoxide to THF solvent. Finally, effects of the reaction time and the reaction temperature also were investigated. The reaction temperature was constrained to a range between ~50° C., below which the reaction is found empirically to be extremely slow, and ~95° C., above excessive solvent boil-off occurred. It was surmised, however, the inability to increase the reaction temperature indefinitely could be compensated with longer reaction times. Thus, the reaction time was varied from 16 to 72 h.

The density for all 33 samples was determined from their physical dimensions and their weight. Surface area and pore diameters were determined by nitrogen adsorption porosimetry. Mechanical strength data (i.e., stress at break point and elastic modulus) were obtained by a three-point bend test method. These and other data are reported below in Table 1 for all 33 of the samples that were prepared.

TABLE 1

Physical characterization of epoxy cross-linked silica aerogels

| run | APTES percent | epoxy type | epoxy percent | time, h | temp, °C. | density, g/cm$^3$ | surface area,[c] m$^2$/g | average pore diam.,[d] A | load force, kg | max stress, 10$^3$ N/m$^2$ | modulus, MPa | weight loss, % |
|---|---|---|---|---|---|---|---|---|---|---|---|---|
| 1 | 50 | tetra | 75 | 16.00 | 50.0 | 0.42 | 358 | 105 | 2.318 | 3.70 | 44.07 | 62 |
| 2 | 25 | tri | 15 | 44.00 | 72.5 | 0.42 | 443 | 116 | 5.112 | 7.78 | 53.50 | 66 |
| 3 | 0 | tetra | 15 | 72.00 | 95.0 | 0.44 | 662 | 125 | 2.497 | 3.46 | 33.33 | 58 |
| 4 | 50 | di | 75 | 16.00 | 95.0 | 0.30 | 462 | 114 | 0.990 | 1.33 | 13.30 | 60 |
| 5 | 25 | tri | 45 | 44.00 | 72.5 | 0.48 | 350 | 134 | 5.820 | 8.77 | 72.64 | 64 |
| 6 | 25 | tri | 45 | 44.00 | 72.5 | 0.47 | 355 | 151 | 6.942 | 10.12 | 71.95 | 63 |
| 7 | 25 | tri | 45 | 44.00 | 95.0 | 0.51 | 280[a] | 143[f] | 11.448 | 16.93 | 87.93 | 68 |
| 8 | 50 | di | 75 | 72.00 | 50.0 | 0.32 | 446 | 186 | 0.978 | 1.39 | 18.84 | 57 |
| 9 | 50 | di | 15 | 72.00 | 95.0 | 0.30 | 439 | 180 | 0.965 | 1.32 | 11.56 | 57 |
| 10 | 25 | tri | 45 | 44.00 | 72.5 | 0.49 | 328 | 146 | 9.439 | 14.16 | 82.17 | 63 |
| 11 | 25 | tri | 75 | 44.00 | 72.5 | 0.59 | 290 | 120 | 5.275 | 8.88 | 126.29 | 64 |
| 12 | 0 | tri | 45 | 44.00 | 72.5 | 0.36 | 267 | 140 | 2.225 | 2.97 | 18.28 | 54 |
| 13 | 0 | tetra | 75 | 72.00 | 50.0 | 0.24 | 670[a] | 83[f] | a | a | a | 14 |
| 14 | 50 | di | 15 | 16.00 | 50.0 | 0.28 | 493 | 86 | 0.661 | 0.06 | 14.55 | 47 |
| 15 | 25 | tri | 45 | 44.00 | 72.5 | 0.49 | 309 | 141 | 5.473 | 8.04 | 74.67 | 63 |
| 16 | 25 | tetra | 45 | 44.00 | 72.5 | 0.42 | 450 | 125 | 3.196 | 4.95 | 46.50 | 55 |
| 17 | 0 | tetra | 15 | 16.00 | 50.0 | 0.20 | 821 | 112 | a | a | a | 10 |
| 18 | 25 | tri | 45 | 44.00 | 72.5 | 0.48 | 343 | 147 | 7.269 | 10.99 | 78.69 | 62 |
| 19 | 50 | tetra | 15 | 16.00 | 95.0 | 0.32 | 464 | 132 | 1.466 | 2.00 | 17.66 | 59 |
| 20 | 50 | tri | 45 | 44.00 | 72.5 | 0.40 | 278 | 91 | 5.750 | 7.47 | 34.98 | 70 |
| 21 | 0 | di | 75 | 72.00 | 95.0 | 0.24 | 444 | 100 | 0.341 | 0.45 | 3.24 | 32 |

TABLE 1-continued

Physical characterization of epoxy cross-linked silica aerogels

| run | APTES percent | epoxy type | epoxy percent | time, h | temp, °C. | density, g/cm$^3$ | surface area,$^c$ m$^2$/g | average pore diam.,$^d$ A | load force, kg | max stress, 10$^3$ N/m$^2$ | modulus, MPa | weight loss, % |
|---|---|---|---|---|---|---|---|---|---|---|---|---|
| 22 | 25 | tri | 45 | 16.00 | 72.5 | 0.44 | 345 | 156 | 5.155 | 7.44 | 63.17 | 60 |
| 23 | 50 | tetra | 75 | 72.00 | 95.0 | 0.41 | 335$^a$ | 104$^f$ | 2.195 | 3.15 | 32.99 | 66 |
| 24 | 50 | tetra | 15 | 72.00 | 50.0 | 0.32 | 459 | 99 | 1.521 | 2.18 | 19.43 | 56 |
| 25 | 0 | di | 15 | 16.00 | 95.0 | 0.26 | 784 | 175 | a | a | a | 13 |
| 26 | 25 | tri | 45 | 44.00 | 72.5 | 0.47 | 312 | 151 | 7.775 | 11.28 | 71.46 | 63 |
| 27 | 25 | tri | 45 | 72.00 | 72.5 | 0.49 | 314 | 147 | 12.950 | 19.05 | 80.08 | 64 |
| 28 | 25 | tri | 45 | 44.00 | 50.0 | 0.47 | 316$^a$ | 119$^f$ | 6.043 | 9.39 | 70.41 | 60 |
| 29 | 0 | di | 15 | 72.00 | 50.0 | 0.21 | 856 | 62 | a | a | a | 10 |
| 30 | 25 | di | 45 | 44.00 | 72.5 | 0.33 | 546 | 145 | 1.855 | 2.79 | 24.35 | 45 |
| 31 | 0 | tetra | 75 | 16.00 | 95.0 | 0.29 | 423 | 115 | 0.440 | 0.67 | 6.94 | 28 |
| 32 | 28 | tri | 35 | 72.00 | 50.0 | 0.45 | b | b | 7.21 | 10.03 | 52.00 | b |
| 33 | 29 | tri | 35 | 72.00 | 50.0 | 0.48 | b | b | 7.39 | 11.57 | 50.70 | b |

$^a$Samples were too fragile for testing.
$^b$samples not tested.
$^c$Surface area of non-cross-linked aerogels: 25% APTES = 739 m$^2$/g: 50% APTES = 622 m$^2$/g.
$^d$Pore diameter of non-cross-linked aerogels: 25% APTES = 117 A. 50% APTES = 89 A.

"Weight loss %" in Table 1 refers to the total weight loss from thermogravimetric analysis, used here to determined the total amount of organic material in the cross-linked aerogels. Note for instance, when no APTES is used the amount of weight loss is 10-30%, whereas with 25-50% APTES, weight loss is usually around 60%. This indicated that epoxy reacts only slightly with Si—OH on the surface, but much more efficiently with amine.

Figure 3:
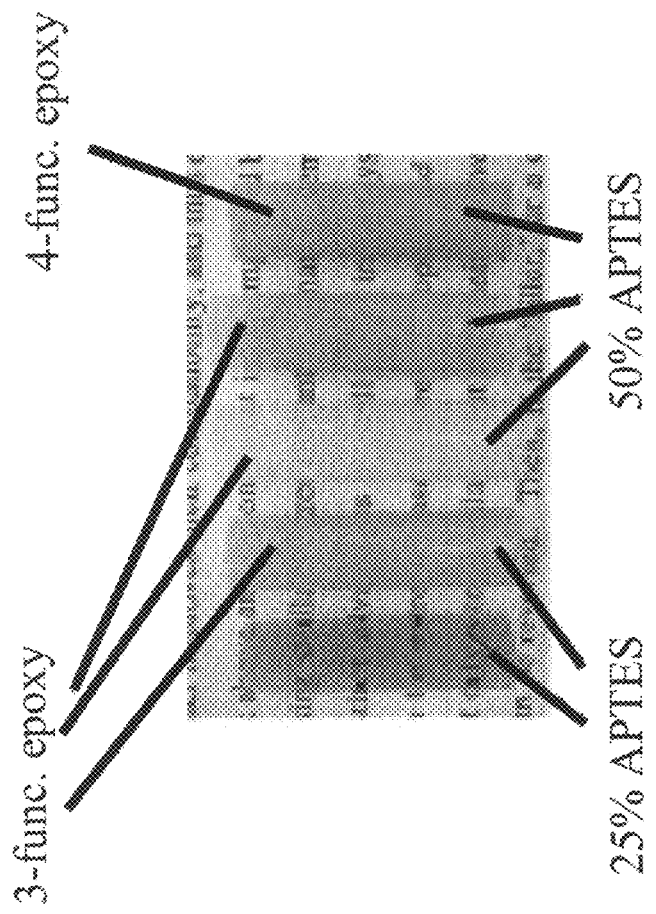
FIG. 3 shows a number of epoxy cross-linked silica aerogels made and described in EXAMPLE 1.

Typical epoxy cross-linked silica aerogels are shown in FIG. 3, along with a sample prepared with a 25% APTES to (APTES+TMOS) volume ratio and no epoxy cross-linking (sample furthest to the left). As seen in FIG. 3, the epoxy cross-linked aerogels generally were translucent. The yellowish coloration observed in both the un-cross-linked and the cross-linked samples comes from a trace amount of base-catalyzed polymerization of acetone, the solvent used in the final washes before supercritical fluid drying. For NH$_4$OH-catalyzed gels, this coloration can be avoided by removing the base with alcohol washes before introducing acetone. For APTES-containing gels, this is obviously not possible because the base is an integral part of the gel backbone.

Figure 4:
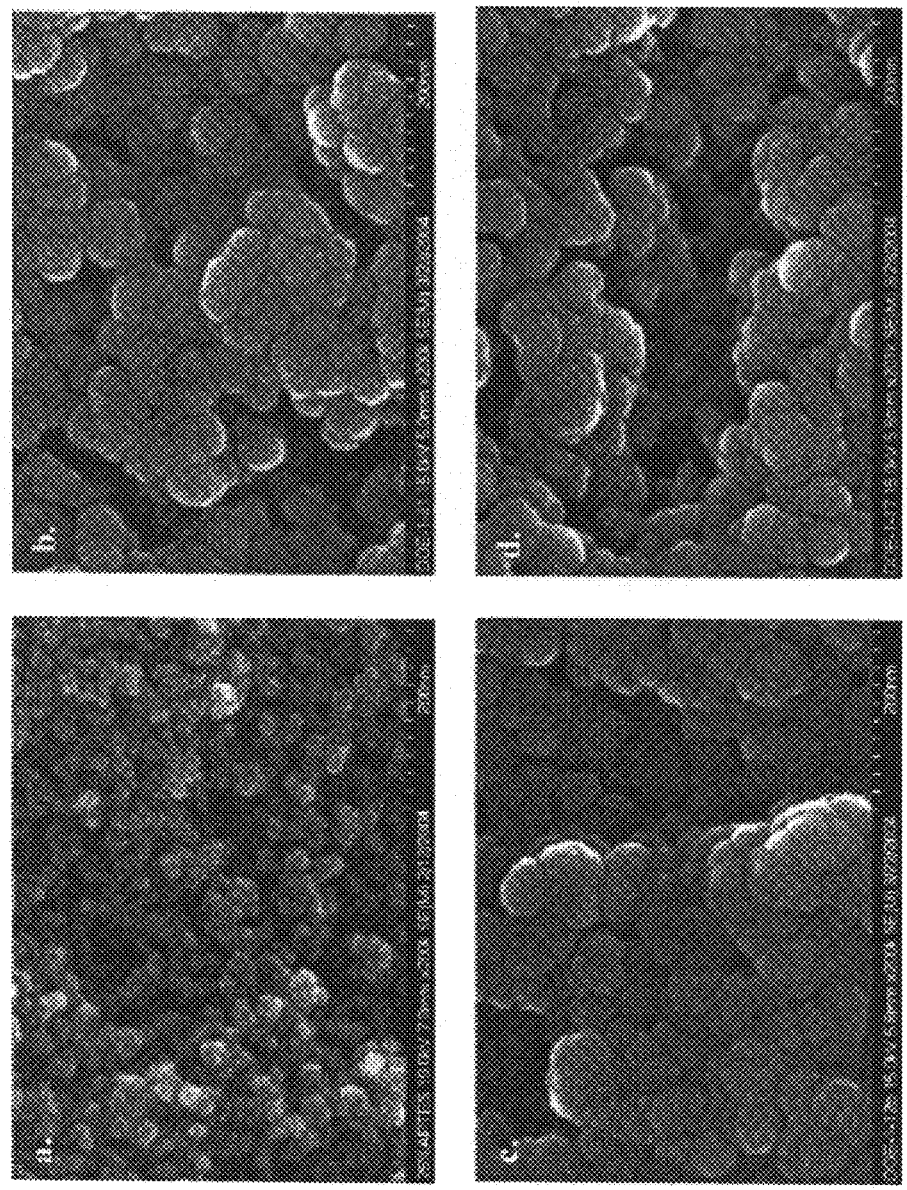
FIG. 4 shows SEM micrographs of four epoxy cross-linked aerogels made and described in EXAMPLE 1.

Microscopically, native APTES/TMOS-containing gels were similar to typical base-catalyzed gels produced from TMOS without APTES. FIG. 4 illustrates SEM micrographs of four of the aerogels produced according to the above methods. Specifically, FIGS. 4a-4d are micrographs of silica aerogels, all produced from a 1:3 APTES:TMOS ratio but with different (or no) epoxide species used for polymer cross-linking. Specifically, 4a, 4b, 4c and 4d show aerogels that were prepared via cross-linking, respectively, with no epoxy cross linking (4a), with the difunctional epoxide (4b), with the trifunctional epoxide (4c), and with the tetrafunctional epoxide (4d). From the micrographs in FIG. 4, it is possible to distinguish primary particles clustered together to form larger secondary particles, which in turn form a "pearl-necklace" type of structure with large voids (mesopores), comparable to the schematic structure illustrated in FIG. 1. The epoxy cross-linked samples look similar to one another, irrespective to the chemical identity of the epoxide employed for cross-linking (FIGS. 4b-d).

It was also observed, e.g. from the micrographs in FIG. 4, that the polymeric cross-linking structure was manifested as an accumulation of polymeric material that followed the surfaces of the secondary particles to produce a conformal coating over those particles and substantially obscured all fine particle definition between secondary particles. In contrast, the mesoporous networks in these aerogels was largely unaffected by the polymer cross-linking structure, and as seen in FIG. 4 remained visible in all three cross-linked aerogel samples (4b-4d) shown in that figure. Thus, the cross-linked epoxy polymeric network produced essentially a polymeric coating over a silica backbone composed of the interconnected secondary particle strands in native silica, but did not extend substantially into the mesoporous space defined in the solid network between the secondary particle strands. Thus, the polymeric network effectively reinforced (as will be seen) the solid network without significantly compromising the total mesoporosity of the silica macrostructure.

Density and mechanical strength data for all samples from Table 1 are plotted in FIGS. 5-7 versus the run order and distinguished by epoxy type. In FIGS. 5-7, circles represent difunctional epoxide cross-linking, squares represent trifunctional epoxide cross-linking, and triangles represent tetrafunctional epoxide cross-linking. The samples were prepared and tested in random order, so the time-series plots in FIGS. 5-7 display a random distribution of values, indicating that no time-dependent errors (e.g., aging of monomers, temperature drift, etc.) were present. For comparison, lines in the graphs of each of FIGS. 5-7 show typical values for density, stress at breakpoint, and modulus for native aerogels (i.e., non-APTES and nonepoxy-modified). Thus, the data in these figures illustrate that while the density of epoxy-cross-linked aerogels is modestly (at most 2-3 times) greater than the density of native silica aerogels, both stress at breakpoint and modulus were dramatically increased by as much as two orders of magnitude. So significant an increase in mechanical strength (100 times or greater) with only a modest increase in overall material density was an extremely surprising and unexpected result. Preferably, polymer cross-linked ceramic oxide particle networks according to the invention will have not more than 10, preferably 8, preferably 5, preferably 4, most preferably 2 or 3, times the bulk density of the corresponding native, uncross-linked aerogel, but at least 10 times, and preferably at least 100 times, greater elastic modulus and ultimate strength (stress at failure or break).

In addition, the data in FIGS. 5-7 illustrate that the increases in all three of the measured physical properties was most striking for the trifunctional epoxy. The data also show that when the trifunctional epoxide was used for cross-linking, more polymeric material was incorporated into the aerogel. This was believed indicative of the difference in reactivity between the epoxide linked through an oxygen (as in the trifunctional epoxide employed herein) versus those linked through nitrogen to a central aromatic core. If the reactivity of these two kinds of epoxides were the same, then a larger molecule such as tetra-epoxy would have shown higher density increases, especially at lower APTES concentrations where amine sites might be too far apart to allow multiple epoxy moieties to bridge across two amines effectively. More specifically, from the data there appears to be a synergistic effect on density between the number of reactive amine sites (percent APTES) on the surfaces of the secondary silica particles and the epoxy concentration. At 0% APTES, increasing epoxy concentration in the THF bath had little effect on the density (since reactivity of any epoxide with the —OH groups on the surfaces of a native aerogel was expected to be low), while at higher concentrations of APTES, increasing the epoxy concentration from 15 to 75% caused the density to double. It is noted that density reached a maximum at around 30% APTES, above which density leveled off. This suggests that at higher concentrations of APTES, as the surfaces of the aerogel particles become fairly crowded with amine sites, more epoxy molecules begin to bridge multiple amine sites. But after a certain APTES concentration, epoxy molecules react with only one amine site rather than bridging multiple sites, adding weight but no additional cross-linking.

Conversely, the reaction time versus temperature data in Table 1 also illustrate that these variables have only a slight effect on density when epoxy and APTES concentration were held at their optimum conditions for strength. At lower concentrations of APTES, both had a more pronounced effect on density.

Average pore diameter and specific surface area data in Table 1 were measured using the Brunauer-Emmet-Teller (BET) method. In general, by comparing the BET surface area with density for the aerogels, it was concluded that samples with higher density have lower surface area. The tri-epoxy samples, which had the highest densities, were the lowest in surface area, followed by tetra and di-epoxy samples. Also, surface area generally decreased with increasing epoxy concentration, APTES concentration, time, and temperature, while density increased under the same conditions. This inverse relationship between surface area and density was attributed to the fact that accumulated cross-linker clogs channels to the micropores, making those surfaces inaccessible for nitrogen adsorption.

Stresses at breakpoint and moduli for the aerogel samples both in Table 1 and FIGS. 5-7 were calculated from stress-strain curves obtained from three-point bend test results for two randomly selected samples of variable density. Stronger samples were found also to be stiffer (they required a higher force for a given amount of deformation) and tougher (larger area underneath the stress-strain curve; i.e., they can store more energy at the breakpoint). Interestingly, unlike the isocyanate cross-linked aerogels described in the above-mentioned U.S. patent application publication, the present epoxide cross-linked aerogels exhibited almost completely elastic behavior, having a substantially linear stress-strain relationship all the way to the point of break or failure (ultimate strength). This is probably attributed to the fact that polymer is actually built up in the case of the isocyanate cross-linked aerogels, where isocyanate chains generally are long and highly branched, producing a thick coating on the secondary particle strands, but not in the case of epoxy linkages which tend to be relatively short, such as just several monomers long. This at least suggests a design criterion for producing elastic versus inelastic aerogels based on selection of suitable cross-linking architectures.

From these experiments, it is evident that incorporation of epoxy increases strength of the aerogels over and above what is to be expected by simple densification, while relatively large surface areas and not much larger pore diameters imply that mesoporosity has been retained. Therefore, it is reasonable to expect that polymeric reinforcement of aerogels through cross-linking should not affect the properties that render aerogels attractive materials for practical applications.

$^{13}C$ and $^{29}Si$ spectrographic analysis of the prepared samples further indicated that at best two epoxy groups per epoxide molecule reacted with the aerogel surface (whether APTES or siloxy group), regardless of whether there were two, three or four epoxy moieties available per molecule. Furthermore, a higher percentage of APTES in the aerogel did not necessarily provide more cross-linking between APTES sites. Rather, more epoxy was bonded to only one APTES, especially evident in the case of the tri-epoxy when the maximum amount of APTES was used. Furthermore, spectrographic data also suggested that APTES incorporated into the silica network was located primarily at the surfaces of the secondary particles. As the APTES concentration increased relative to TMOS in the hydrolysis reactions for preparing the gels, the corresponding Si NMR peak for the APTES group incorporated into the silica network increased in substantially linear relationship (integrated area under the peak) compared to a decrease in the peak assigned to the hydroxyl-containing Si groups present on the secondary particle surfaces. This suggested that APTES amine groups were located primarily at the surfaces of secondary silica particles, thereby replacing hydroxyl groups on those surfaces.

Additional information regarding the present experiments can be found in the inventors' publication, Mary Ann B. Meador et al., "Cross-linking Amine-Modified Silica Aerogels with Epoxies: Mechanically Strong Lightweight Porous Materials," *Chem. Mater.*, vol. 17, pp. 1085-1098, 2005, which is incorporated herein by reference in its entirety.

EXAMPLE 2

Isocyanate Cross-Linked Silica Aerogels from Amine-Decorated Silica Network

Experiments also were conducted to demonstrate the efficacy of cross-linking amine-decorated silica (TMOS-APTES copolymerization as discussed above) using polyisocyanates to produce a polymer cross-linking architecture. To date, cross-linking with isocyanate-derived chemistry utilized only surface silanols, which comprise reaction sites for the diisocyanate. See U.S. patent application publication No. 2004/0132846, incorporated herein.

Because hydrolysis of APTES is slower than hydrolysis of TMOS, in addition to other factors described hereinabove, the amine functionality was found to be mostly positioned on the surfaces of the secondary silica particles where it was readily available for cross-linking. Through reaction with both the surface silanols and amines, a conformal polymer coating was attached to the surface of the string of pearls structure of the secondary particle strands as both carbamate (urethane) and polyurea.

Using a systematic approach, the concentration of the co-polymerized silanes (TMOS and APTES as described previously) in the sol gel, the concentration of diisocyanate the gels were exposed to, and the reaction temperature were varied. The resulting gels were dried by supercritical carbon dioxide extraction. Following this, the maximum stress at failure and modulus were measured using a three-point flexural bending test, and bulk density was determined, also similarly as above. From these data, significant effects of the variables on the measured properties were ascertained, which effects in turn are useful to predict properties of monoliths prepared using other combinations of polymer cross-linking architecture with silica.

Twenty-eight different aerogel monoliths plus two repeats were made as summarized in Table 2.

TABLE 2

Physical properties for isocyanate cross-linked, amine-decorated silica aerogels

| Sample | Total silane, % v/v in $CH_3CN$ | Monomer conc., % w/w in $CH_3CN$ | Cross-linking T, °C. | Bulk density, g/cm³ | Stress at failure, N/m² × 10⁴ | Modulus, MPa |
|---|---|---|---|---|---|---|
| 1 | 30.0 | 0.0 | 25 | 0.136 | 1.32 | 6.91 |
| 2 | 30.0 | 13 | 25 | 0.312 | 466.53 | 15.1 |
| 3 | 30.0 | 6.8 | 25 | 0.270 | 25.33 | 11.2 |
| 4 | 30.0 | 2.3 | 25 | 0.225 | 8.65 | 8.97 |
| 5 | 30.0 | 13 | 71 | 0.449 | 158.60 | 46.7 |
| 6 | 30.0 | 6.8 | 71 | 0.351 | 50.30 | 25.4 |
| 7 | 30.0 | 2.3 | 71 | 0.283 | 37.96 | 15.8 |
| 8 | 17.6 | 0.0 | 25 | 0.083 | 2.45 | 2.61 |
| 9 | 17.6 | 13 | 25 | 0.190 | 7.95 | 4.58 |
| 10 | 17.6 | 6.8 | 25 | 0.179 | 7.54 | 4.27 |
| 11 | 17.6 | 2.3 | 25 | 0.161 | 5.56 | 3.86 |
| 12 | 17.6 | 13 | 71 | 0.347 | 51.52 | 28.8 |
| 13 | 17.6 | 6.8 | 71 | 0.316 | 40.04 | 25.3 |
| 14 | 17.6 | 2.3 | 71 | 0.234 | 14.41 | 10.7 |
| 15 | 7.16 | 0.0 | 25 | 0.042 | 0.67 | 1.01 |
| 16 | 7.16 | 13 | 25 | 0.090 | 8.29 | 0.66 |
| 17 | 7.16 | 6.8 | 25 | 0.083 | 6.92 | 0.44 |
| 18 | 7.16 | 2.3 | 25 | 0.075 | 5.71 | 0.41 |
| 19 | 7.16 | 13 | 71 | 0.155 | 7.74 | 3.44 |
| 20 | 7.16 | 6.8 | 71 | 0.143 | 8.54 | 3.69 |
| 21 | 7.16 | 2.3 | 71 | 0.106 | 6.37 | 1.19 |
| 22 | 4.10 | 0.0 | 25 | 0.026 | 0.09 | 0.10 |
| 23 | 4.10 | 13 | 25 | 0.043 | 2.22 | 0.12 |
| 24 | 4.10 | 6.8 | 25 | 0.038 | 1.68 | 0.10 |
| 25 | 4.10 | 2.3 | 25 | 0.036 | 1.21 | 0.10 |
| 26 | 4.10 | 13 | 71 | 0.072 | 3.40 | 0.36 |
| 27 | 4.10 | 6.8 | 71 | 0.059 | 2.75 | 0.26 |
| 28 | 4.10 | 2.3 | 71 | 0.057 | 2.11 | 0.21 |
| 29 | 30.0 | 13 | 25 | 0.207 | 162.58 | 5.25 |
| 30 | 7.16 | 2.3 | 25 | 0.046 | 4.10 | 0.14 |

As seen from table 2, three preparation conditions were systematically varied: four different concentrations each of total silane (APTES+TMOS) and diisocyanate, and two different polymerization temperatures. Initial total silane concentration (APTES+TMOS in a 1 to 3 v/v ratio) was varied from 4.1%-30% by volume in acetonitrile ($CH_3CN$) to determine the density of the underlying silica aerogel, while the amount of diisocyanate was varied from 0% w/w to 13% w/w in $CH_3CN$ and the cure temperature from 25° C. to 71° C. to determine the degree of cross-linking.

A typical procedure required the mixing of two solutions similarly as in EXAMPLE 1, one containing the silane precursors in acetonitrile solvent at the prescribed concentration as shown in Table 2, the other containing 25% water by volume in acetonitrile. Also as before, the amine-rich APTES eliminated the need for additional base catalysis, and it was necessary to cool the two solutions, this time in an isopropanol/dry ice bath, before mixing together to prevent premature gellation. The solutions were then shaken vigorously and poured into appropriate polypropylene molds. Gellation occurred in anywhere from one minute (30% silane solutions), to a few hours (4.1% solutions). The resulting sol gels were washed a total of four times at 12 hours intervals to remove excess water from the mesopores, leaving only the more strongly adsorbed water on the surface of silica. The gels were then placed in a diisocyanate (Desmoder N3200, a 1,6 hexamethylene diisocyanate-based oligomer) bath of varying concentrations (as shown in Table 2) and allowed to equilibrate until no concentration gradients were observed (usually 24 hours). Afterwards, the monomer solution was decanted, replaced with fresh acetonitrile, and allowed to react for 72 hours either at room temperature or in a 71° C. oven. At the end of the period, oven-cured gels were cooled to room temperature, and the solvent was replaced four times in 24 hour intervals to remove any un-reacted monomer from the mesopores of the wet gels.

The resulting sol gels then were dried using supercritical $CO_2$ extraction as described herein to give the resulting polymer cross-linked aerogel monoliths, and their properties were measured as reported in table 2 above.

The highest density cross-linked aerogel exhibited the highest maximum stress at failure and the highest modulus. Stress at failure for these aerogels was 350 times higher than that of the corresponding non-cross-linked aerogels, while density only increased by a factor of two. The lowest density cross-linked aerogels, which boasted a nominal density of 0.036 g/cm³, still exhibited a forty-fold increase in stress at break over the corresponding uncross-linked aerogels with the same two-fold increase in density.

It was also determined from the above data, through a statistical modeling procedure, that the effect of increasing diisocyanate concentration strongly increased the maximum stress at failure, while its effect on density and modulus was modest, though still statistically significant. Density, maximum stress at failure and modulus all increased with increasing silane concentration as well. For maximum stress, there was also a significant synergistic effect between silane and diisocyanate concentration. In other words, there was a greater increase in maximum stress with increasing silane concentration when the diisocyanate concentration was also high.

Temperature also had a pronounced effect on all three measured responses, density, maximum stress and modulus. All three of these were higher for all combinations of both diisocyanate and total silane concentration. Furthermore, solid C3 CP-MAS NMR spectra of selected monoliths revealed approximately twice the amount of polymer incorporated from the 71° C. heated samples compared to those polymerized at room temperature, as evidenced by integrating one of the APTES methylene peaks against the peaks for the nominally 12 methylenes per repeat unit of the diisocyanate oligomer. This data suggested that although room temperature may provide enough energy for the reaction between the diisocyanate and the APTES amines on the surface of the silica network in the sol gel, elevated temperatures facilitate the reaction to a greater extent. Given that reaction between the diisocyanate and surface hydroxyl groups requires elevated temperatures, and no room temperature cross-linking was observed for non-amine-modified silica surfaces, it was concluded that room temperature cross-linking favors attachment of the diisocyanate through reaction with surface amines. Concurrently, cross-linking at elevated temperatures promotes reaction with both surface amines and residual hydroxyls.

To better illustrate how the material's nano-structure relates to the macroscopic properties observed, nitrogen adsorption data were analyzed for surface area and average pore diameter by the Brunauer-Emmet-Teller (BET) method for selected samples from Table 2. Non-cross-linked aerogels from this study typically had a surface area of 600-700 m²/g depending on the concentration of silanes in the starting sol, while surface areas for the diisocyanate cross-linked aerogels were in the range of 200 to 300 m²/g for monoliths cross-linked at 71° C., and 300 to 400 m²/g for those cross-linked at room temperature. In general, as the amount of diisocyanate incorporated in the aerogel increased (either through increasing diisocyanate concentration or higher cure temperature), the surface area dropped only by a factor of 2. The average pore diameter followed a similar trend as surface area as uncross-linked samples exhibited measured pore diameters of around 8.1 Å, while cross-linked samples fell to between 6.4 to 7.5 Å.

Figure 8:
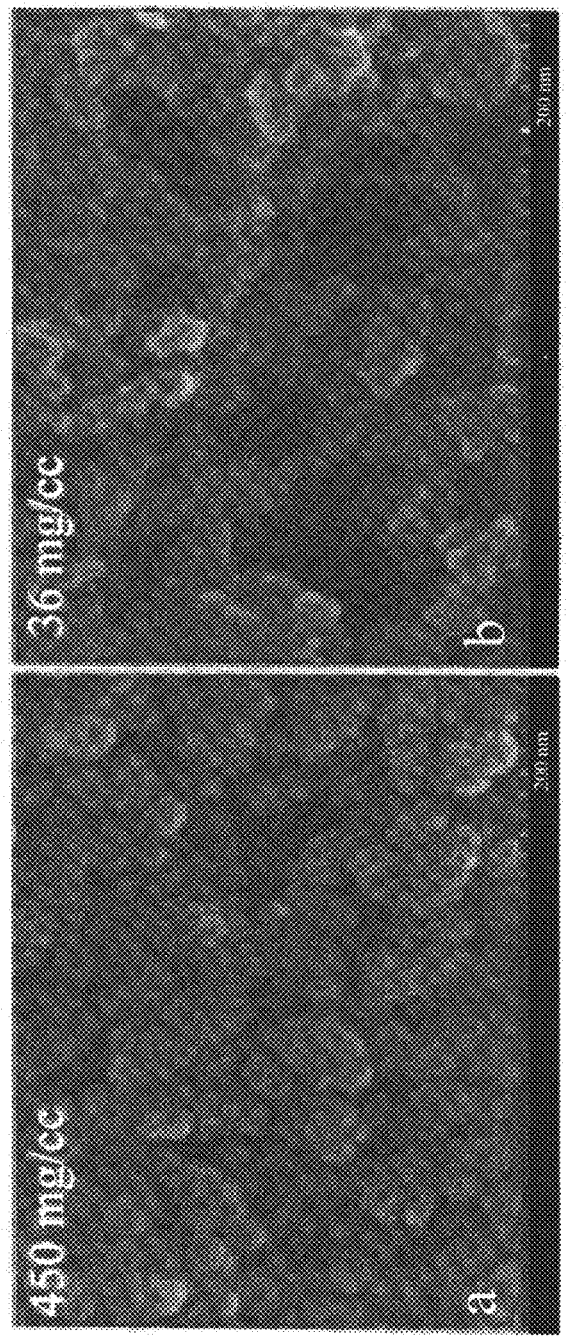
FIG. 8a is an SEM micrograph of an isocyanate cross-linked silica aerogel having a bulk density of 450 mg/cm$^3$, made and described in EXAMPLE 2.
FIG. 8b is an SEM micrograph of an isocyanate cross-linked aerogel having a bulk density of 36 mg/cm$^3$, made and described in EXAMPLE 2.

Interestingly, as the amount of underlying silica in the polymer cross-linked aerogels was decreased, the monoliths exhibit a change in microstructure. At high densities such as at 450 mg/cc as shown in FIG. 8a, the secondary particles resembled a cloud-like configuration with multiple attachments to other secondary particles. In contrast, FIG. 8b shows the microstructure of a lower density aerogel, 36 mg/cc, having a more fibrous-like, elongated particle arrangement. It also appears that the secondary particles are ill-defined in the lower-density polymer cross-linked aerogel, strongly indicating a thicker conformal polymer coating over the secondary particles.

Though the combination of pore diameter and surface area together gives an accurate representation of the material's nanostructure, the true differences in overall nano-porosity are quantified via Eq. 11 where $\rho_b$ is the measured bulk density and $\rho_s$ is the measured skeletal density of the sample aerogels:

$$\text{Porosity (\%)} = \frac{1/\rho_b - 1/\rho_s}{1/\rho_b} \times 100 \quad (11)$$

Thus, one of the highest density native aerogels produced in this study ($\rho_b$=0.136 g/cm³) has a calculated porosity of 91.9%. When this sample was cross-linked using the highest monomer concentration in this experiment, the resulting monolith ($\rho_{b=0.312}$ g/cm³) still remained over 75% porous. (For example, consider the dark spaces in FIG. 8a). At the same time, the porosity of the lowest density native aerogel produced in this study ($\rho_b$=0.026 g/cm³) was extremely high (97.5%). When coated with enough cross-linked polymer to produce the lowest density cross-linked aerogel ($\rho_b$=0.036 g/cm³), the resulting polymer cross-linked aerogel monolith retained an astonishing 95.1% empty space (dark spaces in FIG. 8b).

Concomitant with this change in morphology, the aerogels also were found to become more flexible via three-point bending experiments. This property was observed in those cross-linked aerogels with densities less than 0.1 g/cm³, and is attributed to fewer attachment points between nanoparticles in the lower density nanostructure. Evidently, as the silica structure becomes more open and fibrous, the properties of the polymer cross-links begin to emerge, and in some cases, dominate those of the rigid silica support framework.

Flexibility is a property that aerogels have not previously exhibited, and thus it is indicative that at very low silica content, the aerogel takes on more properties of the polymer cross-linking structure. The use of other types of polymers (toughened epoxies, rubbers, etc.) should introduce even more flexibility into the system. Thus it will be illustrated that an empirical model can be established to tailor aerogels with a particular set of properties for a wide variety of applications, by quantifying a broader range of processing conditions (for example, varying the amount of water, catalyst, washings, reaction time, etc.) for a host of other properties such as thermal conductivity and compressive strength, in addition to density, flexural modulus and stress at failure.

EXAMPLE 3

Polystyrene Cross-Linked Silica Aerogels from Amine-Decorated Silica Network

In another experiment, styrene-containing species were linked to the terminal amines of amine-decorated secondary silica particles made by copolymerization of TMOS with APTES as described above. In these experiments, the chloride on 4-vinylbenzyl chloride was reacted with the terminal amines to attach the styrene moiety to the amine groups, generally of the form

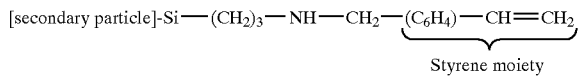

[secondary particle]-Si—(CH₂)₃—NH—CH₂—(C₆H₄)—CH=CH₂
                                              Styrene moiety Then the terminal styrene moieties now attached to the secondary particle surfaces were reacted with styrene-containing monomers, and polymerized to produce polystyrene polymeric cross-links according to the following methodology. It will be understood that in addition to the secondary amine structure illustrated above, tertiary amine structures also are possible, particularly in the presence of excess styrene-containing species. Quaternary amine structures also may be possible, in which case the N atom will have a net positive charge. However this is unlikely at least due to steric considerations.

First, the wet sol gels were prepared similarly as already described. All sol gels were prepared by mixing together two solutions; solution A which contained any silanes and half of the solvent, in this case methanol, and solution B which contained the other half of the solvent, water and any catalyst, if used. Wet gels without aminopropyltriethoxysilane or APTES (as a control) were prepared by mixing together the following mole ratios of TMOS (1 mol), deionized water (3 mol) and methanol (8.5 mol). Catalysis of all gels was provided by adding 6.0E-06 mol of ammonium hydroxide (30% v/v) for every mol of TMOS used in the recipe. Ammonium hydroxide was added to all of the gel recipes for consistency, even though gels including APTES did not require separate catalysis as explained above. Wet gels containing APTES were prepared by adding either 25% v/v or 50% v/v APTES to TMOS. The reaction to form the APTES-containing sol gels had to be slowed down to permit sufficient time to pour the reactive sol into appropriate molds after combining all reactants. This was achieved via cooling in a dry ice-acetone bath prior to mixing solutions A and B for each sol.

Immediately after mixing, all sol-gel solutions were poured into cylindrical molds approximately 1 cm in diameter and four centimeters high to form the desired monoliths for testing. The molds were then sealed with Parafilm and the gels allowed to age for 48 hours. The sol gels were then carefully removed from the molds and were washed approximately every 12 hours with methanol for a total of four times to remove residual catalyst and unreacted TMOS or APTES.

The wet gels were then washed twice with tetrahydrofuran and twice with anhydrous tetrahydrofuran again every 12 hours.

Then, the APTES modified silica sol gels were placed in a THF solution of 4-vinylbenzyl chloride (13% v/v) and allowed to react at 45° C. for 72 hours to attach the terminal styrene moieties to the amine functional groups at the surface of the secondary silica particles as illustrated above. The resulting sol gels were then washed once with fresh THF to remove unreacted species, and four times with chlorobenzene for 6 hours intervals to obtain the final styrene-functionalized wet gels.

The styrene-functionalized wet gels were placed into a solution of styrene-containing monomers and AIBN (radical initiator) in chlorobenzene solvent. Three styrene-containing monomers were used in this experiment: styrene, 2,3,4,5,6-pentafluoro styrene and 4-vinylbenzyl chloride. Each wet gel was placed in 20 mL of one of the following solutions to obtain a cross-linked wet gel based on the desired monomeric styrene-containing species:

a) Styrene monomer (75 mL) and AIBN (3 g) were added into 225 mL of chlorobenzene to obtain a clear solution.
b) Styrene monomer (100 mL), 4-vinylbenzyl chloride monomer (50 mL) and AIBN (3 g) were added into 150 mL of chlorobenzene to obtain a clear solution.
c) 2,3,4,5,6-pentafluoro styrene monomer (18 mL) and AIBN (0.2 g) were added into 22 mL of chlorobenzene to obtain a clear solution.

The gels were then held at 10° C. for 18 hours followed by polymerization at 75° C. for varying time periods in the respective monomeric solutions. Gel permeation chromatography (GPC) studies were performed on the resulting solutions to ascertain the degree of polymerization for each of the gels. The resulting cross-linked sol gels were washed once with chlorobenzene, once with (25:75) acetone:chlorobenzene, once with (50:50) acetone:chlorobenzene, once with (75:25) acetone:chlorobenzene, and twice with acetone by keeping the gels for 6 hours in each of the mentioned solvent systems. Finally, all of the sol gels were dried to produce the corresponding polystyrene cross-linked silica aerogels via the above-described supercritical $CO_2$ exchange and extraction method.

From these experiments, it was observed that better results were obtained from 25% APTES containing gels compared to gels containing 50% APTES (based on APTES+TMOS). Because an excess of 4-vinylbenzyl chloride was used to provide the styrene functionality to the silica sol gels, a mixture of secondary and tertiary amines containing styrene units were believed to result on the secondary particle surfaces. During the polymerization step, it was believed that the surface-bound styrene and free monomers in the solution reacted together, resulting in both binding of different secondary silica particles (e.g. in the neck regions between adjacent secondary particles) and free-end polymer growth from the surface-bound styrenes. The initial monomer concentration and the time for polymerization were used to control the degree of cross-linkage and the final aerogel density, as shown by experimental data. As a control, the 0% APTES gels were subjected to the same styrene functionalization and polymerization conditions. Following these steps, no significant polymer loading was observed on the 0% APTES gel, which demonstrated the importance of providing the surface-bound amine groups. Some experimental data from selected styrene cross-linked aerogels appears below in Tables 3 and 4.

TABLE 3

Physical properties of 4-vinylbenzyl chloride/styrene cross-linked aerogels

| Aerogel Type, APTES % time | Diameter, cm | Density, gr/cm³ | Stress, Mpa | BET Area, m²/g (Av. Pore diam., nm) | Modulus, Mpa |
|---|---|---|---|---|---|
| 25% 3 hr | 0.896 | 0.618 | 0.251 | 243.5 (11.0) | 132.82 |
| 25% 6 hr | 0.889 ± 0.002 | 0.635 ± 0.005 | 0.157 ± 0.016 | 226.0 (11.2) | 125.55 ± 3.07 |
| 25% 24 hr | 0.885 ± 0.002 | 0.717 ± 0.006 | 0.247 ± 0.005 | 180.4 (11.5) | 161.44 ± 10.65 |
| 50% 3 hr | 0.976 ± 0.005 | 0.505 ± 0.003 | 0.201 ± 0.041 | 244.1 (16.3) | 60.79 ± 2.00 |
| 50% 6 hr | 0.951 ± 0.004 | 0.530 ± 0.005 | 0.111 ± 0.010 | 262.0 (13.9) | 71.15 ± 0.27 |
| 50% 24 hr | 0.980 ± 0.015 | 0.546 ± 0.017 | 0.081 ± 0.026 | 228.6 (14.9) | 73.50 ± 2.27 |

TABLE 4

Physical properties of styrene cross-linked aerogels and 2,3,4,5,6-pentafluoro styrene cross-linked aerogel

| Aerogel Type, APTES % time | Diameter, cm | Density, gr/cm3 | Stress, Mpa | BET Area, m²/g (Av. Pore diam., nm) | Modulus, Mpa |
|---|---|---|---|---|---|
| 25% 3 hr | 0.881 ± 0.011 | 0.457 ± 0.017 | 0.093 ± 0.014 | 392.8 (11.2) | 38.82 ± 0.85 |
| 25% 6 hr | 0.887 ± 0.002 | 0.477 ± 0.006 | 0.118 ± 0.014 | 368.3 (11.6) | 62.57 ± 10.83 |
| 50% 3 hr | 0.941 ± 0.020 | 0.413 ± 0.013 | 0.068 ± 0.012 | 390.1 (14.6) | 26.75 ± 4.11 |
| 50% 6 hr | 0.967 ± 0.004 | 0.419 ± 0.010 | 0.059 ± 0.002 | 346.0 (12.5) | 26.16 ± 0.61 |
| 50% 24 hr | 0.963 | 0.768 | 0.387 | 212.8 (11.4) | 94.25 |

EXAMPLE 4

Extrapolation of Disclosed Methods to Other Cross-Linking and Ceramic Oxide Species It should be apparent, as noted above, that a wide variety of polymer-reinforced ceramic oxide aerogels can be prepared based on different combinations of cross-linking architecture (polystyrene, epoxy, isocyanate, etc.). While these three have been actually prepared as described in the foregoing examples, the variety and distinctions among the involved chemistries indicates that other cross-linking architectures also could be employed by attaching the appropriate base or monomeric species to support the desired polymeric architecture onto the surface of the ceramic oxide. In the case of silica, it has been shown that APTES, a functionalized silica precursor species, can be copolymerized with TMOS, a non-functionalized silica precursor species, via a hydrolysis reaction that will remove all of the alkoxy groups from the silicon atoms in both TMOS and APTES (because they are all attached via hydrolysable bonds), but not the aminopropyl group attached to the APTES silicon (because it is attached via a non-hydrolysable bond). To take advantage of the analogous sol gel chemistry to produce ceramic oxide networks based on other, non-silica metallic or nonmetallic atoms, one need prepare the analogous functionalized and unfunctionalized precursor species. Alternatively, the ceramic oxide mesoporous network can be decorated with appropriate functional groups by post-gellation treatment with molecules having the desired functional groups that will support cross-linking via the desired chemistry, but also having another reactive site that can be used to attach the molecule (having the reactive species) to the ceramic oxide network. For example, the mesoporous surfaces of a metallic or semimetallic ceramic oxide network can be decorated with amines by post-gellation treatment with APTES, or they can be modified with styrene by post-gellation treatment with p-trimethoxysilyl styrene.

EXAMPLE 5

Isocyanate Cross-Linked Ceramic Aerogels from Native Surface-Bound Hydroxyl Groups for Numerous Ceramic Oxides To demonstrate the efficacy of cross-linking a variety of ceramic oxide species, over thirty different species of ceramic oxides were cross-linked via an isocyanate cross-linking architecture analogous to that described in Application Publication No. 2004/0132846 for silica. Specifically, surface-bound isocyanate groups were introduced in the respective ceramic oxide networks via reaction of a diisocyanate with the surface-bound hydroxyl groups natively present on ceramic oxide surfaces to produce carbamate (urethane) linkages. Then, the free isocyanate groups of the surface-bound diisocyanates reacted with gellation or coordination water remaining adsorbed on the surface of the ceramic oxide nanoparticles to form amines, which reacted with other diisocyanate monomers in the pore-filling solvent to produce a cross-linked polymer network of polyurea chains anchored to the ceramic oxide network surfaces via urethane linkages.

Polyurea cross-linked (using diisocyanates) ceramic oxide aerogels have been successfully prepared from over 30 different metallic elements. Aerogels from both the non-rare earth and rare earth transition metals were prepared. These included but were not limited to aluminum, chromium, dysprosium, erbium, europium, gadolinium, gallium, hafnium, holmium, indium, lanthanum, lutetium, manganese, neodymium, niobium, praseodymium, ruthenium, samarium, scandium, tantalum, tellurium, terbium, thulium, titanium, tungsten, uranium, vanadium, ytterbium, yttrium and zirconium. All of these gels except for those based on titanium, vanadium, and manganese were prepared using a non-hydrolytic route according to the general procedure described by: (a) T. M. Tillotson, W. E. Sunderland, I. M. Thomas, L. W. Hrubesh Sol-Gel Science and Technology 1994, Vol 1, p 241; (b) A. E. Gash, T. M. Tillotson, J. H. Satcher Jr., L. W. Hrubesh and R. L. Simpson Journal of Non-Crystalline Solids 2001, Vol 285, pp 22-28; (c) A. E. Gash, T. M. Tillotson, J. H. Satcher Jr., J. F. Poco, L. W. Hrubesh and R. L. Simpson Chemistry of Materials 2001, Vol. 13, pp 999-1007. In all cases, either the hydrated metal chloride or the anhydrous metal chloride was dissolved into ethanol. Typically, the target concentration of the metal salt was 0.35 mol/L, while the volume of the ethanolic solution was 20 mL. For the anhydrous metal chloride salts, sufficient water was added to the solution to result in a total of six to seven moles of water for each mole of metal. Once the metal salt was completely dissolved in ethanol, a proton scavenger, epichlorohydrin, propylene oxide or trimethylene oxide was added to the solution in a 10 molar excess over the metal salt. The mole ratio of proton scavenger to metal was 10 to 1. The solution was poured into cylindrical molds and gellation was typically observed within 10-20 min. In some instances, however, (e.g., indium oxide gels) gellation can take up to 3 days. Gels were left to age for at least 24 hours. Subsequently gels were pushed gently out of the molds into vials filled with ethanol. Ethanol was changed another three times every 24 hours, and then the bathing solvent was changed either to acetone or acetonitrile and was changed another 4 times every 24 hours. At that point, wet gels were ready for polymer cross-linking.

Manganese oxide wet gels were prepared using the method described by J. W. Long, K. E. Swindler-Lyins, R. M. Stroud and D. R. Rolison, Electrochemical and Solid-State Letters 2000, Vol. 3, pp 453-456. Typically, potassium permanganate and fumaric acid dissolved in water in a 3:1 molar ratio were left to react in an open flask to vent carbon dioxide produced by the reaction. After a few minutes the solution was poured into molds where it was left to gel and age for at least 24 hours. Gels were washed multiple times with water, an aqueous sulfuric acid solution, water again and finally with acetone. At that point they were ready for polymer cross-linking as described below.

Titanium and vanadium aerogels were prepared from the corresponding alkoxides via sol-gel chemistry analogous to the sol gel chemistry used to prepare the silica aerogels described above. In the case of titanium, the reaction rate was controlled with hydrochloric or nitric acid. For vanadium, no catalyst was required and gellation was carried out in acetone-containing water solution following the general procedures described by F. Chaput, B. Dunn, P. F. Salloux Journal of Non-Crystalline Solids 1995, Vol. 188, pp 11-18. An important modification was the use of vanadyl propoxide (VO(O-n-propyl)$_3$) rather than vanadyl triisopropoxide (VO(O-iso-propyl)$_3$), because it was found that crack-free monoliths are mostly produced by the former precursor. A number of these gellation reactions were quite exothermic and took seconds to gel. To slow down the rate of the reaction in order to allow time for pouring the gels into the molds, solutions were cooled to −78° C. in a dry ice/acetone bath. After gellation, vanadium oxide gels were aged for at least 24 hours, and subsequently were pushed into containers filled with acetone or acetonitrile and were washed 4 times once every 24 hours.

After supercritical drying from carbon dioxide, many of the native (not polymer cross-linked) gels were very delicate. Some were so fragile that they were difficult to handle, particularly those based on titanium and lanthanum.

Samples of each of the corresponding wet gels also were cross-linked using Desmodur N3200; a conventional diisocyanate available from Bayer. This same cross-linking reaction had already been demonstrated to increase the strength of silica aerogels prepared from tetramethylorthosilicate as shown in Publication No. 2004/0132846. To cross-link each of these metal oxide gels, each gel was washed four times with the solvent used to prepare the wet gel and then washed four times with either acetone or acetonitrile, the solvent used for cross-linking. The resulting wet gels were then placed into a diisocyanate solution and allowed to equilibrate for 24 h.

Unlike the silica aerogels, which required heat to facilitate cross-linking, most of the other metal and semimetal oxide wet gels started reacting with the diisocyanates at room temperature.

Material properties of thirteen native aerogels based on rare earth elements, and their corresponding diisocyanate cross-linked aerogels, are reported below in Table 5. The aerogels in Table 5 were ~4 cm long monoliths having the reported diameters. Also reported in Table 5 are properties for some gels, referred to as "Xerogels," which are native, uncross-linked aerogels that were not supercritically dried. The force at rupture data provided in Table 5 were obtained through a three-point flexural bending test similarly as described above in EXAMPLE 1.

TABLE 5

Selected comparative physical property data for native and diisocyanate cross-linked ceramic oxide aerogels

| Metallic Element | Aerogel Sample | Elemental Analysis (% w/w) | | | Diameter (mm) | Density (g/cm3) | | BET Surface Area (m²/g) | Force at rupture (kg)$_1$ | Modulus (MPa)$_1$ | Susceptibility (units × 10$^6$) |
|---|---|---|---|---|---|---|---|---|---|---|---|
| | | Metal | Co$_3$$^{2-}$ | Cl$_T$ (Cl$_W$) | | Bulk | Skeletal | | | | |
| Sc | Native   | 36.61 | 4.4   | —         | 6.12 ± 0.28 | 0.12 ± 0.03 | —           | 592 (7.29)  | —            | —          | −0.6 ± 0.3 |
|    | X-linked | 8.2   | 3.6   | 4.4       | 7.98 ± 0.53 | 0.21 ± 0.04 | 1.15 ± 0.01 | 242 (6.89)  | 1.53 ± 0.14  | 6.2 ± 3.1  | −0.6 ± 0.1 |
|    | Xerogel  | 34.77 | 15.15 | —         | 2.69 ± 0.06 | 1.20 ± 0.03 | —           | 478 (2.31)  | —            | —          | −0.2 ± 0.0 |
| Y  | Native   | 45.52 | 12.76 | 7.6 (6.8) | 8.57 ± 0.14 | 0.12 ± 0.01 | 2.39 ± 0.19 | 528 (7.41)  | —            | —          | −0.3 ± 0.1 |
|    | X-linked | 13    | 5.25  | —         | 8.33 ± 0.02 | 0.36 ± 0.01 | 1.36 ± 0.00 | 144 (9.24)  | 5.67         | 22         | −0.4 ± 0.1 |
|    | Xerogel  | 46.6  | 2.6   | 8.1       | 3.31 ± 0.10 | 1.49 ± 0.09 | —           | 431 (2.74)  | —            | —          | −0.2 ± 0.0 |
| La | Native   | 45.4  | —     | 8.6 (6.1) | —           | —           | —           | 128 (8.34)  | —            | —          | −0.1 ± 0.0 |
|    | X-linked | 31    | 1.69  | —         | 9.84 ± 0.68 | 0.13 ± 0.02 | 1.51 ± 0.02 | 70 (8.32)   | 0.25 ± 0.05  | 16.0 ± 0.9 | −0.4 ± 0.1 |
|    | Xerogel  | 59.3  | —     | 14.2 (7.7)| —           | —           | —           | 208 (6.20)  | —            | —          | −0.3 ± 0.0 |
| Pr | Native   | 55.28 | 12.95 | 9.0 (6.0) | 7.88 ± 0.42 | 0.18 ± 0.03 | 2.82 ± 0.16 | 186 (8.40)  | —            | —          | 17.8 ± 2.2 |
|    | X-linked | 18.3  | 5.7   | —         | 8.37 ± 0.65 | 0.38 ± 0.13 | 1.41 ± 0.03 | 130 (7.12)  | 7.09 ± 0.08  | 15.1 ± 0.4 | 5.9 ± 0.1  |
|    | Xerogel  | 58.77 | 3.84  | 8.6       | 3.48 ± 0.04 | 1.56 ± 0.19 | —           | 296 (3.51)  | —            | —          | 21.2 ± 0.2 |
| Nd | Native   | 55.56 | 10.82 | 7.0 (6.4) | 7.73 ± 0.24 | 0.19 ± 0.02 | 3.14 ± 0.41 | 384 (10.9)  | —            | —          | 17.9 ± 1.3 |
|    | X-linked | 20.1  | 4.2   | —         | 8.71 ± 0.43 | 0.46 ± 0.06 | 1.39 ± 0.01 | 144 (14.89) | 19.09 ± 4.03 | 36.4 ± 6.4 | 4.2 ± 0.2  |
|    | Xerogel  | 59.43 | 3.12  | 7.4       | 3.38 ± 0.01 | 2.09 ± 0.10 | —           | 307 (3.04)  | —            | —          | 20.3 ± 0.5 |
| Sm | Native   | 56.31 | 10.42 | 6.3 (5.9) | 7.52 ± 0.17 | 0.22 ± 0.02 | 2.97 ± 0.12 | 383 (9.30)  | —            | —          | 5.1 ± 0.4  |
|    | X-linked | 18.1  | 5.2   | —         | 8.45 ± 0.30 | 0.39 ± 0.05 | 1.39 ± 0.01 | 168 (9.83)  | 13.43 ± 0.80 | 25.9 ± 2.6 | 0.7 ± 0.0  |
|    | Xerogel  | 56.73 | 3.21  | 6.5       | 3.41 ± 0.01 | 2.04 ± 0.01 | —           | 257 (2.78)  | —            | —          | 3.9 ± 0.1  |
| Eu | Native   | 56.7  | 11.31 | 5.8 (5.2) | 7.61 ± 0.32 | 0.20 ± 0.02 | 2.47 ± 0.14 | 379 (7.67)  | —            | —          | 16.6 ± 1.5 |
|    | X-linked | 19    | 2.29  | —         | 7.70 ± 0.68 | 0.53 ± 0.08 | 1.42 ± 0.03 | 144 (10.17) | 14.34        | 3.6        | 5.2 ± 0.2  |
|    | Xerogel  | 59.22 | 4.6   | 6.6       | 3.20 ± 0.05 | 2.11 ± 0.05 | —           | 300 (2.78)  | —            | —          | 18.5 ± 0.4 |
| Gd | Native   | 58.54 | 9.63  | 5.8 (5.1) | 8.04 ± 0.36 | 0.18 ± 0.02 | 3.14 ± 0.24 | 383 (10.9)  | —            | —          | 90.8 ± 1.3 |
|    | X-linked | 20.6  | 5.79  | —         | 8.17 ± 0.21 | 0.44 ± 0.01 | 1.40 ± 0.03 | 171 (9.76)  | 10.90 ± 2.26 | 28.5 ± 5.2 | 30.6 ± 0.3 |
|    | Xerogel  | 59.83 | 4.14  | 5.8       | 3.38 ± 0.02 | 2.02 ± 0.02 | —           | 294 (2.84)  | —            | —          | 101.6 ± 3.7|
| Tb | Native   | 57.4  | 8.97  | 5.2 (4.6) | 7.65 ± 0.38 | 0.20 ± 0.01 | 3.32 ± 0.31 | 365 (8.82)  | —            | —          | 130.5 ± 5.9|
|    | X-linked | 19.1  | 3.9   | —         | 8.30 ± 0.14 | 0.42 ± 0.03 | 1.40 ± 0.01 | 160 (9.46)  | 6.30 ± 0.73  | 29.6 ± 7.5 | 43.6 ± 0.4 |
|    | Xerogel  | 58.13 | 3.2   | 5.7       | 3.48 ± 0.02 | 1.96 ± 0.02 | —           | —           | —            | —          | 145.3 ± 2.1|
| Dy | Native   | 59.3  | 7.42  | 5.0 (4.1) | 8.02 ± 0.09 | 0.18 ± 0.01 | 3.02 ± 0.13 | 366 (8.23)  | —            | —          | 167.6 ± 3.5|
|    | X-linked | 21    | 4.72  | —         | 8.16 ± 0.06 | 0.46 ± 0.06 | 1.44 ± 0.01 | 176 (7.55)  | 2.62 ± 0.28  | 20.5 ± 3.2 | 59.2 ± 3.1 |
|    | Xerogel  | 60.21 | 3.98  | 4.8       | 3.44 ± 0.06 | 2.00 ± 0.12 | —           | 295 (2.75)  | —            | —          | 181.7 ± 3.2|
| Ho | Native   | 57.46 | 9.63  | 4.3       | 7.57 ± 0.18 | 0.21 ± 0.01 | 2.47 ± 0.22 | 358 (10.92) | —            | —          | 139.1 ± 7.0|
|    | X-linked | 20.6  | 4.28  | —         | 8.35 ± 0.20 | 0.42 ± 0.03 | 1.41 ± 0.02 | 177 (14.9)  | 6.57 ± 1.31  | 19.3 ± 1.3 | 54.8 ± 3.4 |
|    | Xerogel  | 57.36 | 3.23  | 4.7       | 3.39 ± 0.12 | 2.13 ± 0.04 | —           | 278 (2.94)  | —            | —          | 167.5 ± 4.5|
| Er | Native   | 59.66 | 7.5   | 4.9 (4.0) | 8.36 ± 0.25 | 0.16 ± 0.01 | 3.28 ± 0.26 | 368 (8.9)   | —            | —          | 104.5 ± 5.4|
|    | X-linked | 22.4  | 5.34  | —         | 8.41 ± 0.34 | 0.40 ± 0.05 | 1.14 ± 0.01 | 157 (7.02)  | 13.65 ± 1.41 | 16.4 ± 2.8 | 43.9 ± 0.3 |
|    | Xerogel  | 59.64 | 4.8   | 5.7       | 3.43 ± 0.02 | 2.04 ± 0.05 | —           | 299 (2.93)  | —            | —          | 133.2 ± 4.2|
| Tm | Native   | 60.73 | 6.43  | 4.8 (4.0) | 8.63 ± 0.57 | 0.14 ± 0.02 | 3.17 ± 0.12 | 349 (8.88)  | —            | —          | 66.2 ± 1.7 |
|    | X-linked | 21.8  | 4.75  | —         | 8.59 ± 0.04 | 0.34 ± 0.01 | 1.44 ± 0.01 | 170 (9.21)  | 5.65 ± 0.75  | 9.8 ± 1.4  | 31.1 ± 1.1 |
|    | Xerogel  | 60.32 | 3.73  | 4.3       | 3.38 ± 0.02 | 1.96 ± 0.09 | —           | 312 (2.92)  | —            | —          | 84.5 ± 4.2 |
| Yb | Native   | 64.29 | 9.06  | 4.7 (4.0) | 8.43 ± 0.08 | 0.15 ± 0.01 | 3.25 ± 0.16 | 345 (7.89)  | —            | —          | 31.2 ± 1.9 |
|    | X-linked | 21.9  | 1.96  | —         | 8.38 ± 0.12 | 0.38 ± 0.01 | 1.49 ± 0.01 | —           | —            | —          | 10.9 ± 0.4 |
|    | Xerogel  | 61.69 | 8.18  | 4.2       | 3.43 ± 0.03 | 1.73 ± 0.15 | —           | 323 (3.47)  | —            | —          | 28.1 ± 0.2 |
| Lu | Native   | 64.56 | 4.03  | 4.4       | —           | —           | —           | 214 (9.64)  | —            | —          | 0.1 ± 0.3  |
|    | X-linked | 23.7  | 3.03  | —         | 8.35 ± 0.07 | 0.39 ± 0.02 | 0.39 ± 0.02 | 120 (7.78)  | 7.25 ± 0.30  | 18.7 ± 5.1 | 0.9 ± 0.0  |
|    | Xerogel  | 59.85 | 3.02  | 4.2       | 3.49 ± 0.03 | 1.96 ± 0.05 | —           | —           | —            | —          | 0.08 ± 0.04|

$_1$Force at rupture and modulus values are reported only for the cross-linked aerogels because the native aerogels were too fragile to measure these values, and the corresponding "Xerogels" collapsed.

These aerogels were characterized by elemental analysis, infrared spectroscopy, thermogravimetric analysis, and nitrogen adsorption porosimetry. Properties of interest were chemical composition, bulk and skeletal densities, mesoporous surface area and pore size, mechanical strength as well as magnetic properties. Infrared spectroscopy and carbonate analysis indicated that these metal oxide aerogels reacted somewhat with carbon dioxide during the supercritical drying process from carbon dioxide. Remarkably, however, the incorporation of carbon dioxide as carbonate was not quantitative, which would probably have led to disintegration of the aerogel monoliths. The carbonate incorporation in the aerogels was also evident by the relatively smaller magnetic susceptibility of the aerogels relative to the corresponding "Xerogels," which were obtained by drying the wet gels under vacuum.

Skeletal densities of native rare earth aerogels are significantly higher than the skeletal density of silica, reflecting their higher atomic mass. However, bulk densities of all rare earth aerogels are comparable to one another and in the same range as the density of typical silica aerogels, reflecting the small amount of solids in the ceramic oxide skeletal framework. Surface area analysis yields high surface areas for the native aerogels and somewhat decreased values for the corresponding cross-linked aerogels, similarly as for silica. Again the most notable property enhancement for the cross-linked aerogels compared to their native analogs was increased mechanical strength.

Figure 10:
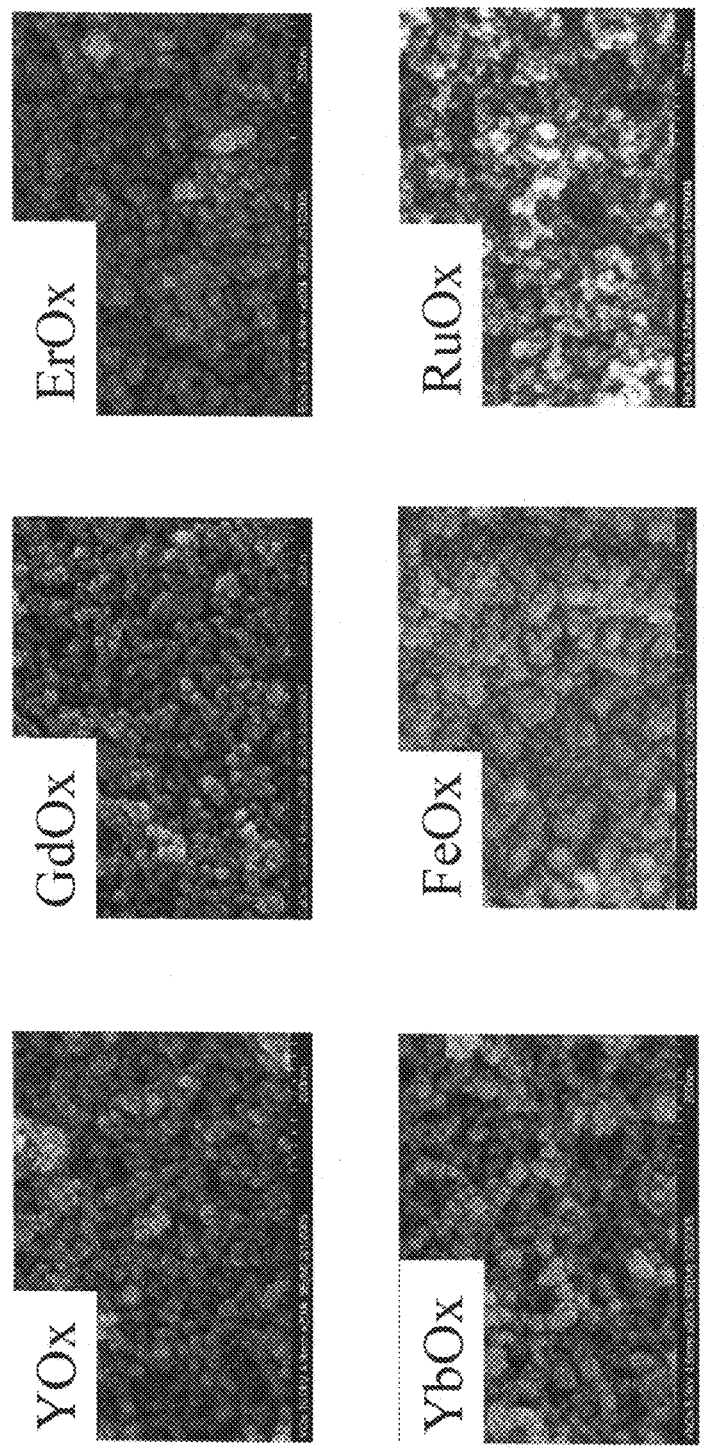
FIG. 10 shows representative SEM micrographs of several ceramic oxides that have been cross-linked using diisocyanate to produce a conformal polyurethane/polyurea coating over the mesoporous ceramic oxide particle network.
Figure 11A:
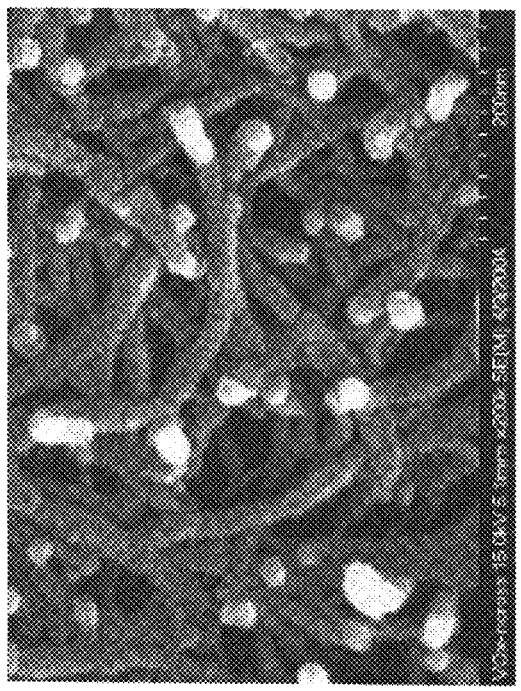
FIGS. 11a-11b are SEM micrographs of native and diisocyanate cross-linked $VO_x$ aerogels, respectively.
Figure 11B:

Microscopically, all metal oxide aerogels look very similar to one another and very similar to typical silica aerogels. Representative scanning electron micrographs of selected native metal oxide aerogel samples are shown in FIG. 10, where it is seen that typical native aerogels have a similar particulate network structure, comprising a random distribution of a pearl necklace-type strands of nanoparticles, consistent with the structure of silica discussed above. It was also found (with one exception) that the mechanical properties of non-silica cross-linked aerogels were not much different from one another or from comparable cross-linked silica aerogels of similar density. $VO_x$ aerogels, based on vanadium, appear from SEM micrographs to look as though primary particles form secondary worm-like structures rather than an agglomeration of mostly round secondary particles. See, e.g, FIGS. 11a and 11b, showing the microstructure of a native and a diisocyanate cross-linked vanadium aerogel, respectively. Both these samples had the same bulk density for the uncross-linked $VO_x$ aerogel (prior to cross-linking in FIG. 11b). The two samples appear very similar, even though the density of the latter is four to six times greater than that of the former (native $VO_x$), indicating rather heavy polymer loading. Their apparent similarity indicates that the isocyanate cross-linking polymer structure (polyurethane/polyurea) was deposited as a substantially conformal coating over the mesoporous secondary surfaces of the $VO_x$ aerogel.

Figure 12:
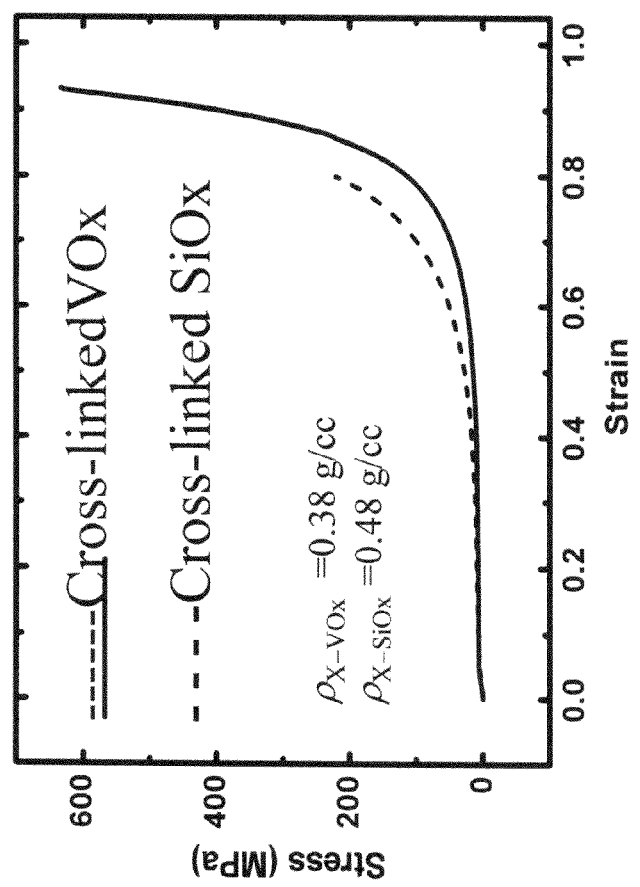
FIG. 12 compares the stress-strain curves for a diisocyanate cross-linked vanadia aerogel and a diisocyanate cross-linked silica aerogel of similar density as explained in EXAMPLE 5.

Cross-linked vanadium aerogels proved to be tough materials relative to other types of crosslinked aerogels. FIG. 12 compares the stress-strain curve of a typical Desmodur N3200 diisocyanate cross-linked vanadia aerogel having a bulk density of 0.38 g/cc under compression testing, with the analogous curve of a Desmondur N3200 diisocyanate cross-linked silica aerogel of similar density (0.48 g/cc) under the same conditions. Compression tests were conducted according to ASTM D695-02a using ~½ inch diameter by ~1 inch long monolith samples of the respective aerogels. It is noted the cross-linked silica sample shattered at 77% strain under ~25,000-30,000 psi stress, while the cross-linked vanadium aerogel remained in one piece (although it was nearly fully consolidated) even after more than 100,000 psi stress and more than 93% strain.

It is highly probable that the morphology of the underlying skeletal network of cross-linked aerogels coupled with the extremely high polymer loading plays a significant role in the added toughness. In that regard, fibrous structures such as those evident of vanadium aerogels (see FIGS. 11a-11b) are probably more apt to retain some structural integrity than the more globular pearl-necklace type microstructures. It is expected that this realization will comprise a point of departure for the design of a plethora of lightweight materials with different failure modes based on the general concept of a polymer coated three-dimensional assemblage or network of nanoparticles.

As noted above and demonstrated in examples, cross-linking the solid ceramic oxide network in a wet gel results in the corresponding aerogel having superior mechanical strength compared to the native ceramic oxide aerogels. In addition, such superior strength, quite surprisingly and unexpectedly, has been found to come at only a modest increase in overall or bulk density for the aerogels. Without wishing to be bound by a particular theory, it is believed that the dramatically improved strength qualities of the polymer cross-linked aerogels disclosed herein may be attributable to one or more of the following reasons.

The mesoporous structure of conventional aerogels, (which is largely responsible for their desirable properties such as high specific surface area, low density, low thermal conductivity, etc.), results from the sol-gel process for producing the corresponding wet gels via hydrolysis from an appropriate ceramic oxide precursor, e.g. TMOS for silica, followed by supercritical fluid extraction to produce the structurally intact and dried aerogel. Physically, the mesoporous structure consists of fully dense 1-2 nm amorphous particles, which in many ceramic oxides assemble or are agglomerated into ball-like secondary particles (5-10 nm). These secondary particles are connected together at interfaces known as neck regions located between adjacent secondary particles, fashioned by dissolution and re-precipitation of the sol gel during aging. This structure also is apparent for several of the polymer cross-linked silica aerogels described herein, based on their micrographs shown in FIGS. 4 and 8. These voids located between entangled and interconnected nano- (secondary) particle strands comprise the aerogel's mesoporous network that is responsible for the desirable properties noted above. An exaggerated neck region between two adjacent secondary silica particles is illustrated schematically in FIG. 9, which also illustrates a reaction for cross-linking the particles via polyurealpolyurethane chains extending between respective surface hydroxyls on the particles.

When stress incident on a conventional aerogel causes fracture, fracturing is believed to occur primarily at the interfaces of secondary particles (necks), while secondary particles themselves remain intact. The incorporation of a nanocast polymer coating covalently bonded to the surface of the ceramic oxide framework before drying to produce the aerogel is believed to reinforce these neck regions by widening them so that they are better able to withstand mechanical loads. At the same time, because the polymeric networks are provided in the form of substantially conformal coatings over the interconnected particle strand network and do not extend substantially into the mesopores defined between the strands, the polymeric networks are able to provide such reinforcement while only minimally reducing porosity and increasing bulk density. This would explain the observed 2 to 3 times increase in measured bulk density for cross-linked aerogels, but 100-200 or more times increase in physical strength properties such as elastic modulus and ultimate strength (stress at break).

Another benefit of the polymer cross-linked aerogels disclosed herein is that they are much less hygroscopic than native aerogels, which has been another problem inhibiting their use in many applications. The observed decrease in hydrophilicity is believed to be due to the reduced number of Si—OH groups on the surface and the addition of the largely hydrocarbon conformal coatings from the organic cross-links. Indeed, use of fluorocarbon containing monomers such as pentafluorostyrene as an additional cross-linker in the styrene cross-linked aerogels reduces hydrophilicity even more.

Although the hereinabove described embodiments of the invention constitute the preferred embodiments, it should be understood that modifications can be made thereto without departing from the scope of the invention as set forth in the appended claims.

What is claimed is:

1. A structure comprising a solid-phase three-dimensional network of ceramic oxide particles having functional groups bound to surfaces of said particles, said network of ceramic oxide particles being cross-linked via organic polymer chains that are attached to said particles via reaction with at least a portion of said surface-bound functional groups, said ceramic oxide having the form $ZO_x$ where 'Z' is a metallic or semimetallic element other than silicon.

2. A structure according to claim 1, said surface-bound functional groups comprising hydroxyl groups native to ceramic oxides.

3. A structure according to claim 2, said surface-bound functional groups further comprising non-hydroxyl functional groups.

4. A structure according to claim 1, said polymer chains being polyurea chains extending from or between, and linked to, surfaces of said ceramic oxide particles via carbamate linkages formed through reaction between a surface-bound hydroxyl group and an isocyanate group on an organic polymer or polymerizable species.

5. A structure according to claim 4, said metallic or semimetallic element being an element selected from the group consisting of: Sc, Y, La, Pr, Nd, Sm, Eu, Gd, Tb, Dy, Ho, Er, Tm, Yb, Lu and V.

6. A structure according to claim 1, wherein 'Z' is a mixture of metallic or semimetallic elements other than silicon, such that said ceramic oxide is a composite ceramic oxide composed of a plurality of species of metallic and/or semimetallic atoms linked via interposed oxygen atoms.

7. A structure according to claim 1, said three-dimensional network of ceramic oxide particles being in the form of a dried aerogel that is cross-linked via said organic polymer chains, said polymer cross-linked aerogel having a bulk density not more than about 10 times greater than the bulk density of the corresponding uncross-linked aerogel, but at least 10 times greater elastic modulus than the corresponding uncross-linked aerogel.

8. A structure according to claim 7, said polymer cross-linked aerogel having an elastic modulus that is at least 100 times greater than the elastic modulus of the corresponding uncross-linked aerogel.

9. A structure according to claim 8, said polymer cross-linked aerogel having a bulk density not more than about 3 times greater than the bulk density of the corresponding uncross-linked aerogel.

* * * * *

UNITED STATES PATENT AND TRADEMARK OFFICE
CERTIFICATE OF CORRECTION

PATENT NO. : 8,227,363 B2  Page 1 of 1
APPLICATION NO. : 12/658318
DATED : July 24, 2012
INVENTOR(S) : Nicholas Leventis et al.

It is certified that error appears in the above-identified patent and that said Letters Patent is hereby corrected as shown below:

In Table 1 at Column 26, replace the heading of the 11th column of the table, "max stress, $10^3$ N/m$^2$", with "max stress, $10^5$ N/m$^2$".

In Table 1 at Column 26, for the 14th run replace "0.06" in the 11th column of the table with "0.96".

In Table 1 at Column 28, replace the heading of the 11th column of the table, "max stress, $10^3$ N/m$^2$", with "max stress, $10^5$ N/m$^2$".

Signed and Sealed this
Eighteenth Day of September, 2012

David J. Kappos
*Director of the United States Patent and Trademark Office*